United States Patent [19]
Reik et al.

[11] Patent Number: 5,680,918
[45] Date of Patent: Oct. 28, 1997

[54] TORQUE TRANSMITTING APPARATUS

[75] Inventors: Wolfgang Reik, Bühl; Robert Felger, Bühl-Neusatz; Albert Albert, Bühl, all of Germany

[73] Assignee: Luk Lamellan und Kupplungsbau GmbH, Bühl, Germany

[21] Appl. No.: 778,513

[22] Filed: Jan. 3, 1997

Related U.S. Application Data

[63] Continuation of Ser. No. 263,919, Jun. 20, 1994, abandoned.

[30] Foreign Application Priority Data

| Jun. 19, 1993 | [DE] | Germany | 43 20 381.7 |
| Sep. 30, 1993 | [DE] | Germany | 43 33 460.1 |

[51] Int. Cl.$^6$ ............................................. F16D 47/02
[52] U.S. Cl. .............. 192/55.1; 192/55.61; 192/70.13; 192/70.17; 74/574; 464/46; 464/68
[58] Field of Search ............................. 192/55.1, 55.61, 192/56.6, 70.13, 70.17, 89.23, 212; 74/574; 464/46, 68

[56] References Cited

U.S. PATENT DOCUMENTS

| 4,274,524 | 6/1981 | Nakane | 192/70.17 X |
| 4,760,754 | 8/1988 | Friedmann | 74/574 |
| 4,790,419 | 12/1988 | Loizeau | 195/55.1 X |
| 4,989,710 | 2/1991 | Reik et al. | 192/70.17 |
| 5,042,632 | 8/1991 | Jäckel | 192/55.61 X |
| 5,161,660 | 11/1992 | Huber | 192/106.2 |
| 5,367,920 | 11/1994 | Bonfilio | 74/574 |

FOREIGN PATENT DOCUMENTS

| 3838307 | 5/1990 | Germany | 192/70.13 |

*Primary Examiner*—Richard M. Lorence
*Attorney, Agent, or Firm*—Darby & Darby

[57] ABSTRACT

A torque transmitting apparatus which can be installed between the prime mover and the transmission of a motor vehicle has a primary flywheel connectable to the output element of the prime mover. A secondary flywheel is coaxial with and rotatable relative to the primary flywheel. A friction clutch with a clutch disc drives the input element of the transmission when the clutch is engaged. A damper is provided between the two flywheels. The damper and the friction clutch constitute a power train which is provided with a coupling device serving to afford access to the clutch disc without damage to the elements of the power train, and with one or more slip clutches which limit the magnitude of the torque transmittable from the primary flywheel to the clutch disc in the engaged condition of the friction clutch. The slip clutch or slip clutches can form part of the coupling device or vice versa.

29 Claims, 10 Drawing Sheets

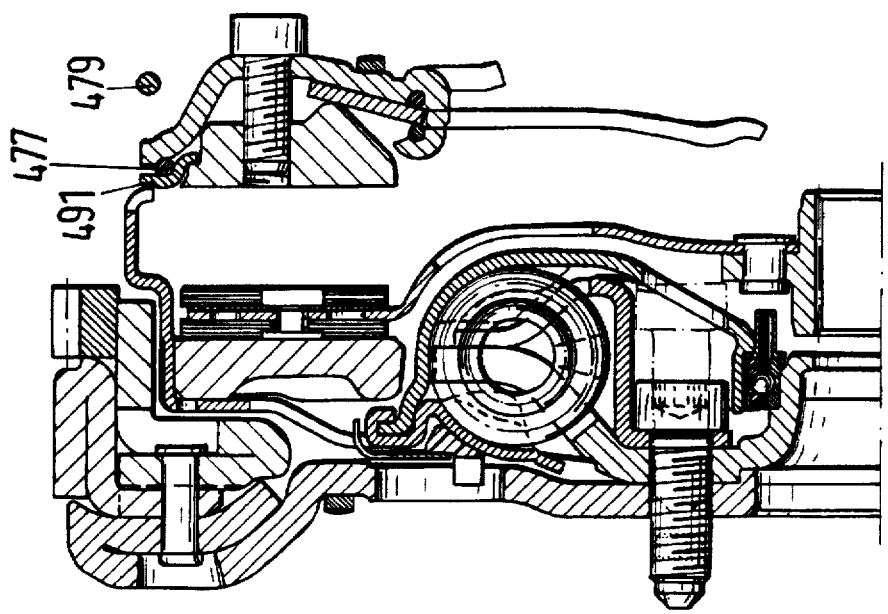
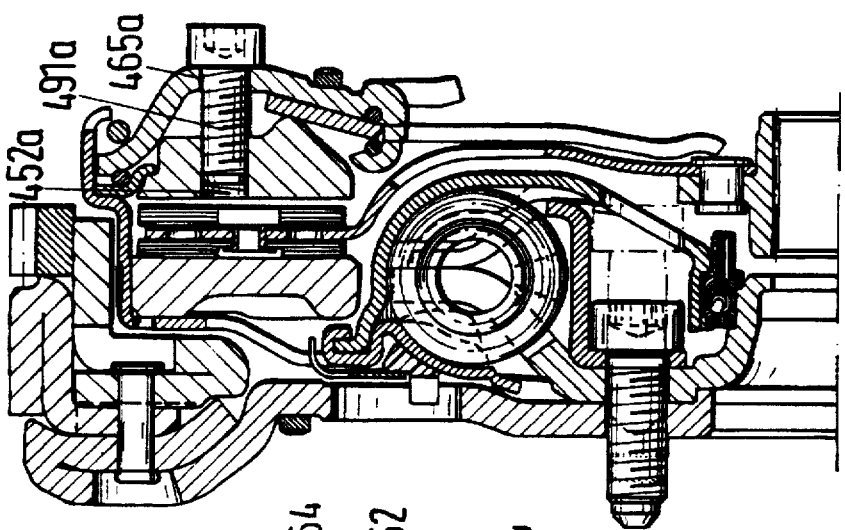
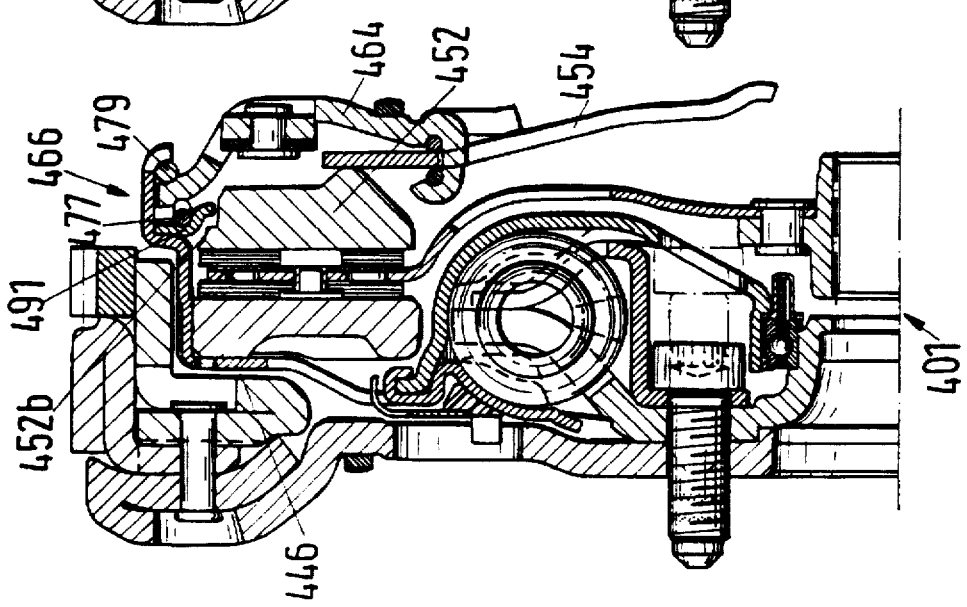

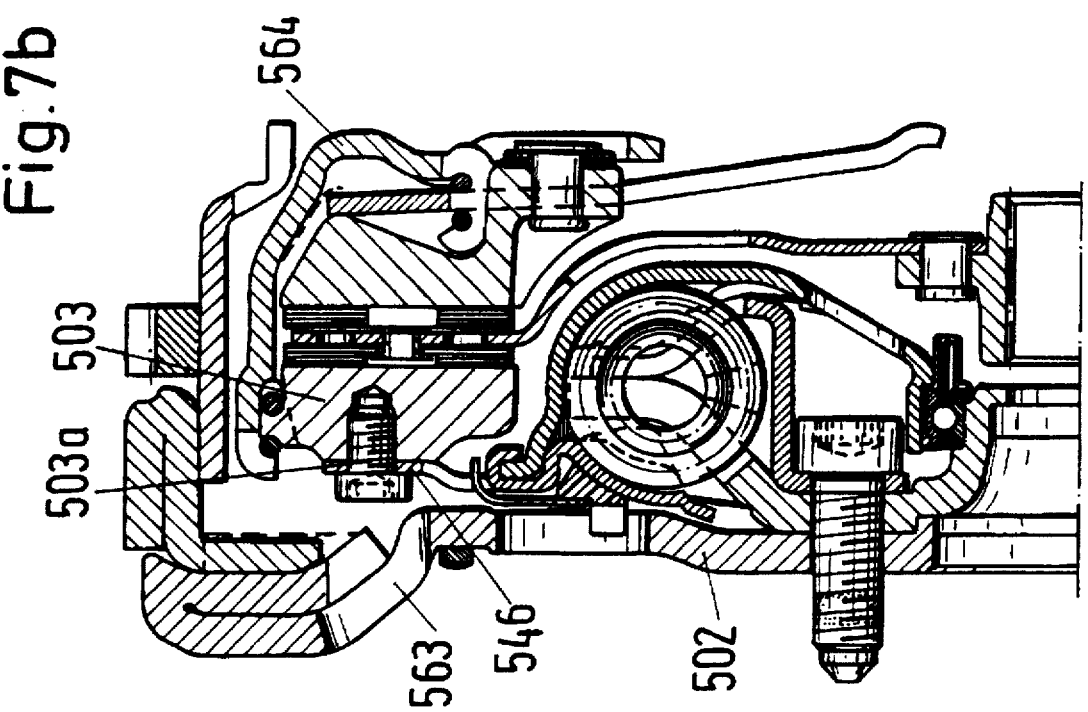
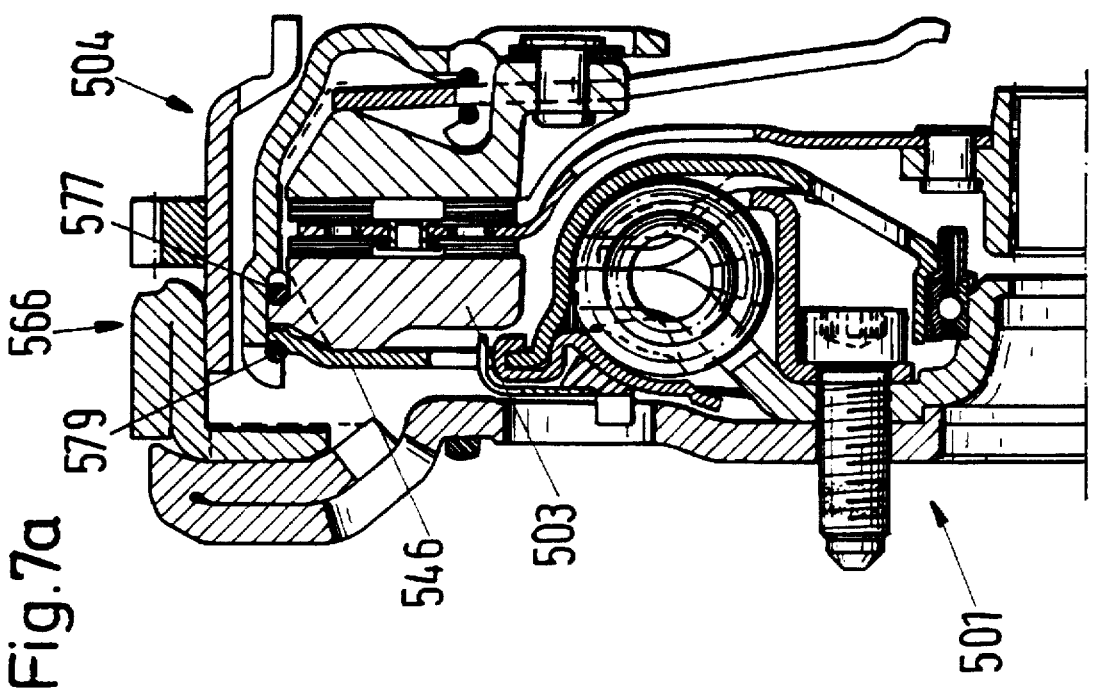

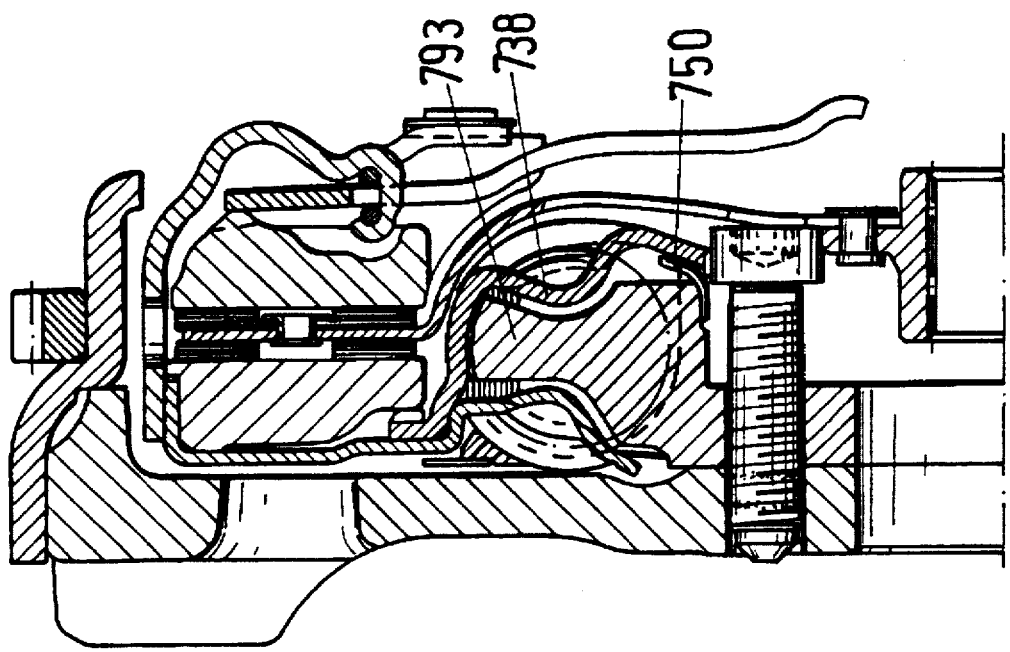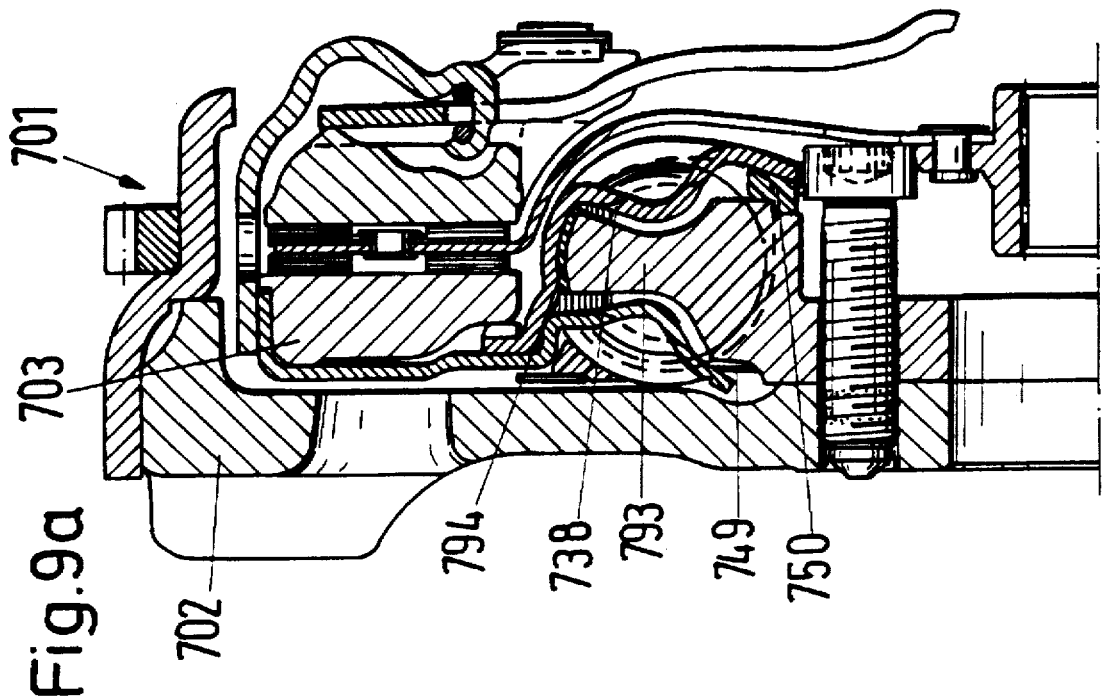

5,680,918

TORQUE TRANSMITTING APPARATUS

This is a continuation of application Ser. No. 08/263,919, filed Jun. 20, 1994 now abandoned.

BACKGROUND OF THE INVENTION

The present invention relates to improvements in torque transmitting apparatus and, more particularly, to apparatus which can be utilized to transmit torque between prime movers (such as internal combustion engines or electric motors) and rotary driven parts (such as the input shafts of variable-speed transmissions) in motor vehicles. Still more particularly, the invention relates to improvements in torque transmitting apparatus wherein one or more dampers with two or more energy storing elements are utilized to oppose rotation of plural flywheels relative to each other and wherein a friction clutch is interposed between one of the flywheels and the rotary driven part or input element of a transmission.

A drawback of presently-utilized torque transmitting apparatus for use in motor vehicles is that they are too bulky for installation in certain types of motor vehicles, particularly in vehicles wherein the engine extends transversely of the direction of forward movement of the vehicle.

Another drawback of presently-known torque transmitting apparatus of the type employing a friction clutch is that certain parts of the friction clutch (particularly the clutch disc, the pressure plate and the counterpressure plate) are not readily accessible for inspection or replacement in the event of extensive wear.

A further drawback of many presently-known torque transmitting apparatus is that they do not embody safety features which prevent the transmission of excessive torque to one or more driven parts, such as the input shaft of a variable-speed transmission in a motor vehicle.

OBJECTS OF THE INVENTION

An object of the invention is to provide a compact, inexpensive and reliable torque transmitting apparatus.

Another object of the invention is to provide a torque transmitting apparatus which is compact in the axial direction as well as in the radial direction of its rotary parts.

A further object of the invention is to provide a torque transmitting apparatus whose useful life is longer than, or can be prolonged beyond, the useful life of heretofore utilized and proposed torque transmitting apparatus.

An additional object of the invention is to provide a torque transmitting apparatus which, in spite of its simplicity and compactness, is provided with safety features and other features which are lacking in bulkier and more expensive apparatus of presently-known design.

Still another object of the invention is to provide a motor vehicle wherein the power train between the prime mover and one or more driven parts embodies a torque transmitting apparatus of the above-outlined character.

A further object of the invention is to provide a novel and improved method of assembling and mounting the above-outlined torque transmitting apparatus under the hood of a motor vehicle.

Another object of the invention is to provide a novel and improved module which contains at least a large majority of component parts of the above-outlined torque transmitting apparatus.

An additional object of the invention is to provide a torque transmitting apparatus which can be readily dismantled to a desired extent, for example, to afford access to certain parts which are likely to be damaged as a result of extensive wear or for other reasons, such as overheating.

Still another object of the invention is to provide a torque transmitting apparatus which embodies a friction clutch having a clutch disc and wherein the clutch disc can be inspected or replaced with little loss in time and without necessitating even partial destruction of and/or other damage to other component parts of the apparatus.

A further object of the invention is to provide a torque transmitting apparatus which embodies a friction clutch and wherein the friction surfaces of the friction clutch are not smaller than in heretofore known friction clutches in spite of the compactness of the improved apparatus.

Another object of the invention is to provide a torque transmitting apparatus which can be utilized with advantage in many types of motor vehicles including those wherein the output element of the prime mover extends transversely of the direction of forward movement of the vehicle.

An additional object of the invention is to provide a torque transmitting apparatus which comprises a small number of simple and inexpensive parts, the parts of which can be mass produced in available machines and with minimal waste of material, and whose assembly can be automated to any desired extent.

Still another object of the invention is to produce and assemble the component parts of the improved apparatus with substantial savings in energy, without contamination of the atmosphere and with unexpectedly large savings in time and material.

A further object of the invention is to provide a torque transmitting apparatus which is constructed and assembled in such a way that it reliably prevents damage to driven parts as a result of the transmission of excessive torque.

Another object of the invention is to provide a novel and improved friction clutch for use in the above-outlined apparatus.

Another object of the invention is to provide a novel and improved composite flywheel for use in the above-outlined apparatus.

An additional object of the invention is to provide a novel and improved damper for use in the above-outlined apparatus.

Still another object of the invention is to provide a novel and improved combination of a friction clutch, multiple flywheel assembly and damper for use in the above-outlined apparatus.

A further object of the invention is to provide a novel and improved method of transmitting torque from a prime mover to a transmission in a motor vehicle.

Another object of the invention is to provide novel and improved means for centering various rotary constituents of the above-outlined torque transmitting apparatus relative to each other.

SUMMARY OF THE INVENTION

One feature of the present invention resides in the provision of an apparatus for transmitting torque, e.g., between the prime mover and the variable-speed transmission of a motor vehicle. The improved apparatus comprises a first flywheel which is connectable to an output element (e.g., to the crankshaft or camshaft of a combustion engine in a motor vehicle), an engageable and disengageable friction clutch connectable with a rotary input element (such as the input shaft of a variable-speed transmission in a motor vehicle), a second flywheel rotatable with and relative to the first flywheel about a common axis, and means for opposing rotation of the flywheels relative to each other. Such opposing means comprises at least one damper having energy storing means acting in the circumferential direction of the flywheels. The at least one damper and the friction clutch constitute a power train between the first flywheel and the input element. Such a power train comprises means for separably coupling a first and a second component of the power train to each other and means for limiting the magnitude of torque which can be transmitted between the first flywheel and the input element in the engaged condition of the friction clutch.

The aforementioned components of the coupling means can form part of the friction clutch. The arrangement can be such that the clutch comprises the aforementioned components of the coupling means and that its spring (e.g., a diaphragm spring) forms part of the torque limiting means.

The second flywheel can constitute the counterpressure plate of the friction clutch and is then provided with a first friction surface disposed at a first radial distance from the common axis of the flywheels. The torque limiting means can be designed in such a way that it includes a second friction surface also provided on the second flywheel at a second radial distance from the common axis of the flywheels. The second radial distance can equal or at least approximate the first radial distance.

The pressure plate of the friction clutch can be centered relative to the clutch housing and relative to the second flywheel exclusively by friction. This renders it possible to more readily and more rapidly gain access to the clutch disc which is subject to wear as a result of repeated engagement and disengagement of the friction clutch. The power train can be designed in such a way that the entire friction clutch is centered relative to the first flywheel exclusively by friction.

One of the aforementioned components of the coupling means can include or constitute an output member of the at least one damper, and the other component of such coupling means can include the housing of the friction clutch. The secondary flywheel can be mounted on the output member of the at least one damper. The output member can include a portion extending substantially radially of the common axis of the flywheels and overlying a collar of the housing. Alternatively, the housing can include a portion which extends substantially radially of the common axis of the flywheels and overlies a collar of the output member of the at least one damper. In other words, the housing or the output member can be provided with a collar, and the output member or the housing then comprises a portion which extends substantially radially of the common axis of the flywheels and overlies the collar. The inner diameter of the radially extending portion is smaller than the outer diameter of the collar.

In accordance with one presently preferred embodiment, the coupling means further comprises a split ring which separably connects the components to each other. Such coupling means can further comprise means for preventing rotation of the split ring relative to at least one component of the coupling means. The means for preventing rotation can comprise an abutment for at least one of the two end portions of the split ring. The aforementioned radially extending portion of one of the components of the coupling means can include a first set of tongues which engage the split ring, and the collar of the other component can include a second set of tongues which engage the split ring.

If the torque limiting means is designed in such a way that it includes the clutch spring of the friction clutch, this spring is stressed in the direction of the common axis of the flywheels, at least in the engaged condition of the friction clutch. Such torque limiting means can further comprise at least one additional spring which is stressed in the direction of the common axis of the flywheels. The at least one additional spring can comprise an elastic (e.g., corrugated) washer which is installed between the housing of the friction clutch and the second flywheel. Alternatively, the at least one additional spring can include or constitute a resilient wear detector or sensor which forms part of a unit serving to automatically compensate for wear upon the clutch disc (and preferably also upon the pressure plate and the counterpressure plate) of the friction clutch.

If one of the aforementioned components of the coupling means includes or forms part of an output member of the at least one damper and another component of the coupling means includes the housing of the friction clutch, the at least one additional spring can be interposed between the output member and that side of the aforementioned collar (of the output member or the housing) which faces away from the aforementioned ring between the collar and the aforementioned radially extending portion of the housing or the output member. The at least one additional spring serves to bias the ring in the direction of the common axis of the flywheels.

The output member of the at least one damper is installed in such a way that a portion thereof is biased by the energy storing means in a direction to rotate the second flywheel in response to rotation of the first flywheel. The energy storing means of the at least one damper is preferably designed and installed in the improved torque transmitting apparatus in such a way that it is nearer to the common axis of the flywheels than the friction surface(s) of the friction clutch.

The output member of the at least one damper can include, constitute or form part of an enclosure which is driven by one of the flywheels and defines a chamber which at least partially confines the energy storing means. The chamber can be at least partially filled with a supply of pulverulent or viscous lubricant. Such chamber can constitute or include an annulus (e.g., a ring-shaped compartment for the energy storing means) which extends circumferentially of the flywheels. The aforementioned enclosure includes at least one wall, and such wall can form part of or can include or constitute one component of the coupling means.

The torque limiting means of the power train can comprise or constitute a friction generating device which operates in parallel with the energy storing means of the at least one damper.

One presently-preferred embodiment of the torque limiting means includes one of the flywheels and a wall of the aforementioned enclosure which defines the chamber for the energy storing means of the at least one damper.

The torque limiting means can be disposed at a plane which is at least substantially normal to the common axis of the flywheels, and the chamber of the enclosure can be located at or at least close to such plane.

The torque limiting means can include at least one friction generating member (e.g., a lining or shoe) which engages a wall of the enclosure for the energy storing means of the at least one damper. Such torque limiting means further comprises means for maintaining the wall and the at least one friction generating member in frictional engagement with each other. The at least one friction generating member can be made, at least in part, of a plastic material.

The torque limiting means can be designed to limit the transmission of torque in each angular position of the flywheels relative to each other. Alternatively, the apparatus can be constructed and assembled in such a way that the torque limiting means is effective only while the flywheels rotate relative to each other through an angle which is less than the maximum possible angle.

The friction generating member or members of the torque limiting means can be biased against a wall of the enclosure for the energy storing means of the at least one damper by one or more springs acting in the direction of the common axis of the flywheels. Such biasing means can comprise one or more diaphragm springs, and such spring or springs can be connected to the wall. To this end, the apparatus further comprises means for affixing the diaphragm spring or springs to the wall. The friction generating member or members can be influenced (such as acted upon) by a device or member which forms part of the first flywheel.

The apparatus can be assembled in such a way that the friction surface or surfaces of the torque limiting means are disposed radially outwardly of the energy storing means and that the friction surface or surfaces of the friction clutch can be spaced apart from the common axis of the flywheels by a distance which at least approximates the distance of the friction surface or surfaces of the torque limiting means from such common axis. The torque limiting means of such torque transmitting apparatus can be installed or interposed between the output member of the at least one damper and the second flywheel.

The first flywheel and at least some constituents of the power train (such as the clutch disc, the second flywheel, the pressure plate, the clutch spring of the friction clutch and one or more parts of the at least one damper) can be assembled into a module which can be affixed to the output element, e.g., to the camshaft or the crankshaft of a combustion engine in a motor vehicle. The means for affixing the module to the output element can comprise fasteners which preferably form part of the module. The latter then preferably comprises means (e.g., in the form of elastic inserts) for preventing accidental detachment of the fasteners from the first flywheel and/or from one or more constituents of the power train.

The friction clutch can be a pull-type or a push-type clutch.

Another feature of the invention resides in the provision of an apparatus which serves to transmit torque and comprises a first flywheel connectable to a rotary output element, and a power train which comprises an engageable and disengageable friction clutch connectable to an input element and including a second flywheel rotatable with and relative to the first flywheel about a common axis. The power train further comprises means for opposing rotation of the flywheels relative to each other, and such opposing means includes at least one damper having energy storing means (e.g., an annulus of arcuate coil springs), an input member between the first flywheel and the energy storing means, and an output member which is disposed between the energy storing means and the second flywheel and includes an enclosure at least partially confining the energy storing means. Still further, the power train comprises means for limiting the magnitude of torque which can be transmitted between the first flywheel and the input element in the engaged condition of the friction clutch. The energy storing means is disposed at a first radial distance from the common axis of the flywheels and the torque limiting means has at least one first friction surface disposed at a greater second radial distance from the common axis. The friction clutch has at least one second friction surface which is disposed at a third radial distance from the common axis of the flywheels, and the third radial distance can match or approximate the second distance.

A further feature of the invention resides in the provision of an apparatus for transmitting torque between rotary output and input elements. The apparatus comprises a first flywheel which is connectable to the output element, and a power train between the first flywheel and the input element. The power train comprises an engageable and disengageable friction clutch including a second flywheel which is rotatable with and relative to the first flywheel about a common axis, means for opposing rotation of the flywheels relative to each other including at least one damper having energy storing means acting in the circumferential direction of the flywheels, means for separably coupling a first component to a second component of the power train (preferably in such a way that the coupling means affords convenient access to the clutch disc of the friction clutch), and means for limiting the magnitude of torque which is being transmitted between the first flywheel and the input element in response to rotation of the first flywheel and in the engaged condition of the friction clutch.

The torque limiting means can comprise a slip clutch.

The torque limiting means can form part of the coupling means or vice versa.

One of the first and second components of the coupling means can form part of or can include or constitute an output member of the at least one damper, and the other of the first and second components can include or constitute or form part of a housing of the friction clutch.

The torque limiting means can include a member of the at least one damper and a part (such as the housing) of the friction clutch. It is also possible to construct the torque limiting means in such a way that it includes the second flywheel and a member of the at least one damper.

The torque limiting means can comprise a member of the at least one damper and at least one of the parts including the second flywheel, the housing, the pressure plate and the clutch disc of the friction clutch. Still further, such torque limiting means can include a device which forms part of the friction clutch and has means for automatically compensating for wear upon the second flywheel, the pressure plate and/or the clutch disc of the friction clutch.

The torque limiting means can be designed in such a way that it includes a member (such as the output member) of the at least one damper and the second flywheel or the housing of the friction clutch.

The first and second components of the coupling means can include separable first and second portions of the housing of the friction clutch, and such coupling means can further comprise means for separably fastening the first and second portions of the housing to each other.

BRIEF DESCRIPTION OF THE DRAWINGS

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain presently preferred specific embodiments with reference to the accompanying drawings, wherein:

FIG. 5c illustrates a detail of the structure which is shown in FIG. 5a;

FIG. 6a is a fragmentary axial sectional view of a fifth torque transmitting apparatus with the friction clutch engaged;

FIG. 6b shows the structure of FIG. 6a but with the friction clutch in the disengaged condition;

FIG. 6c shows the structure of FIG. 6a but with the housing of the friction clutch detached from a member of the damper which opposes rotation of the flywheels relative to each other;

FIG. 7a is a fragmentary axial sectional view of a seventh torque transmitting apparatus;

FIG. 7b is a fragmentary axial sectional view of an eighth torque transmitting apparatus constituting a modification of the apparatus of FIG. 7a;

FIG. 9a is a fragmentary axial sectional view of a tenth torque transmitting apparatus; and FIG. 9b is a fragmentary axial sectional view of an eleventh torque transmitting apparatus constituting a modification of the apparatus shown in FIG. 9a.

DESCRIPTION OF PREFERRED EMBODIMENTS

Figure 1:
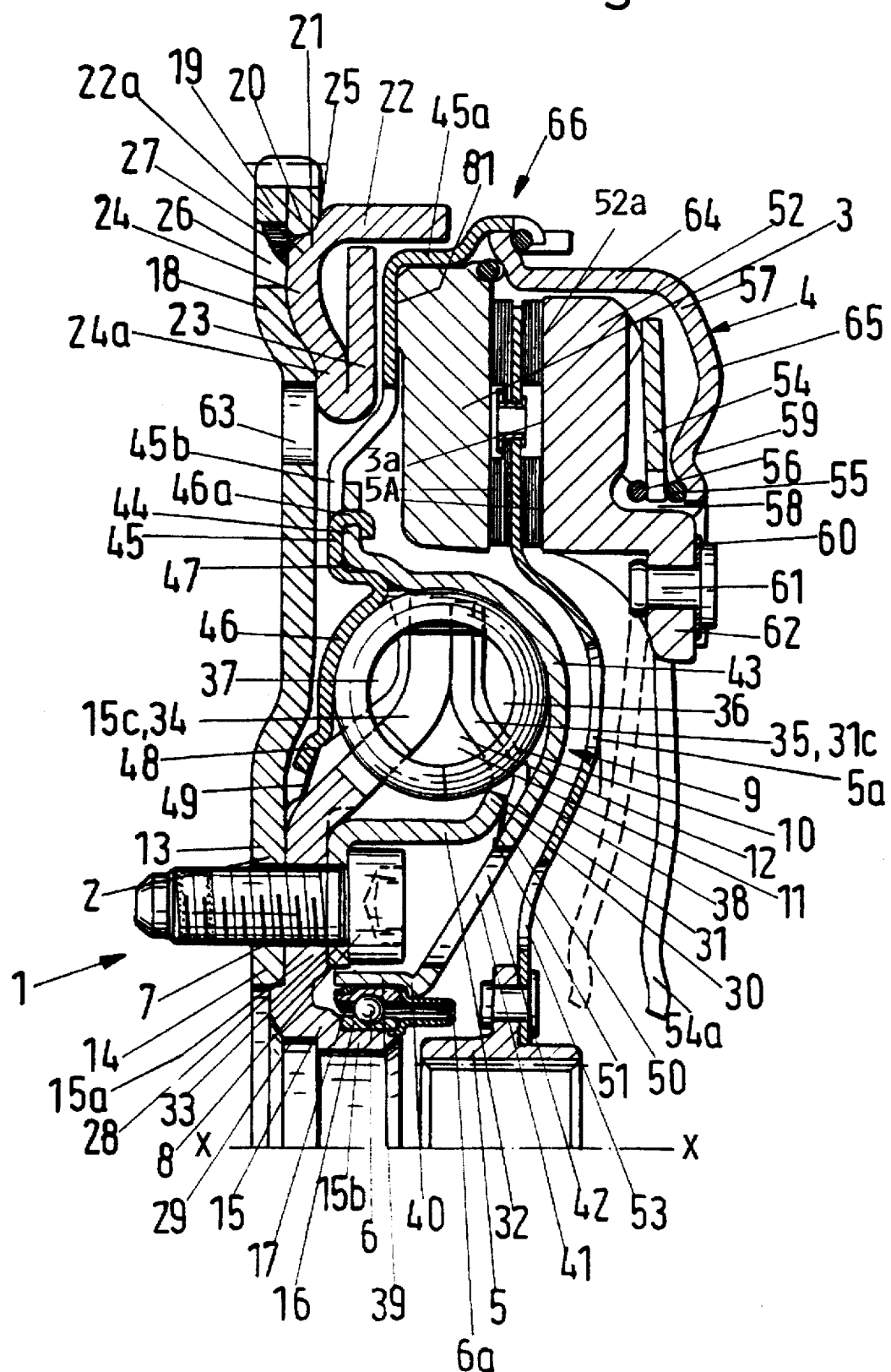
FIG. 1 is a fragmentary axial sectional view of a torque transmitting apparatus embodying one form of the present invention.

FIG. 1 shows a portion of a torque transmitting apparatus which includes a composite flywheel 1 comprising a first or primary flywheel 2 connectable to the output element (e.g., the camshaft or the crankshaft) of a prime mover (such as the combustion engine of a motor vehicle), and a second or secondary flywheel 3 which is rotatable with as well as relative to the primary flywheel 2 about a common axis X—X. The secondary flywheel 3 forms part of a friction clutch 4 which, together with the primary flywheel 2 and a damper 9 between the two flywheels, constitutes a power train between the output element of the prime mover and the rotary input element (e.g., a shaft) of a torque receiving device, such as a variable-speed transmission of a motor vehicle. Reference may be had, for example, to commonly owned U.S. Pat. No. 4,989,710 granted Feb. 5, 1991 to Reik et al. for "Torque transmitting and torsion damping apparatus for use in motor vehicles". The patent describes and shows an engine, and output element which transmits torque from the engine to a primary flywheel, and a friction clutch which drives the rotary input element of a variable-speed transmission. Reference may further be had to commonly owned German patent applications Nos. P 43 20 381 corresponding to U.S. patent application Ser. No. 08/262,620 filed Jun. 20, 1994 and P 43 11 908 corresponding to U.S. patent application Ser. No. 08/044,031, filed Apr. 7, 1993 which illustrate composite flywheels of the character useful in the torque transmitting apparatus of the present invention.

The secondary flywheel 3 constitutes counterpressure plate of the friction clutch 4 which further comprises an axially movable pressure plate 52 disposed between the flywheel 3 and a housing or cover 57, a clutch spring (here shown as a diaphragm spring) 54 which biases the pressure plate 52 axially toward the flywheel 3, at least when the friction clutch is engaged, and a clutch disc 5 having linings 5A disposed between a friction surface 3a of the flywheel 3 and a friction surface 52a of the pressure plate. When the clutch 4 is engaged, the friction surfaces 3a and 52a bear upon the adjacent surf-aces of the friction linings 5A at the radially outer portion of the clutch disc 5 so that the hub of the clutch disc transmits torque to the input element of the transmission.

The illustrated clutch disc 5 constitutes but one of a wide variety of clutch discs which can be utilized in the friction clutch 4. Reference may be had, for example, to commonly owned U.S. Pat. No. 5,161,660 granted Nov. 10, 1992 to Huber for "Clutch plate with plural dampers" which describes and shows clutch discs with dampers between the hubs and the respective friction linings. Furthermore, the illustrated clutch disc 5 can be replaced by a clutch disc with resilient elements between the radially outermost portion of the disc-shaped carrier for friction linings and the adjacent (inner) sides of the friction linings. Such resilient elements then cooperate with the clutch spring 54 to maintain the friction surfaces 3a and 52a in requisite frictional engagement with the respective linings when the clutch is engaged.

The illustrated friction clutch 4 is a so-called push-type clutch because the radially inwardly extending prongs 54a of the clutch spring 54 must be pushed toward the flywheels 2, 3 in order to disengage the clutch, namely to enable the pressure plate 52 to move axially of and away from the flywheel (counterpressure plate) 3 in order to enable the clutch disc 5 to turn relative to the flywheels and/or vice versa. However, the invention can be embodied with equal or similar advantage in so-called pull-type friction clutches which are disengaged in response to the application of a pull upon the prongs of the clutch spring in a direction away from the flywheels. All that is necessary is to place the locus of engagement between the clutch spring and the pressure plate radially inwardly of the seat or seats for the clutch spring on or in the clutch housing.

An antifriction bearing 6 (here shown as a simple ball bearing with a single row of spherical rolling elements between an inner race 16 and an outer race 17) is installed between the flywheels 2 and 3 radially inwardly of the energy storing elements 10 of the damper 9. The bearing 6 is installed radially inwardly of an annulus of holes or bores 7 which are provided in the primary flywheel for the shanks of bolts 8 which serve as a means for releasably affixing the composite flywheel 1 as well as the damper 9 and the remaining parts of the friction clutch 4 to the output element of the prime mover.

The bearing 6 includes a closure or cap 6a which can confine a supply of lubricant (such as grease) for the rolling elements. Furthermore, the closure or cap 6a constitutes a thermal barrier which operates between the flywheel 3 and the bearing 6. The flywheel 3 is heated during engagement and disengagement of the friction clutch 4 due to the sliding of its friction surface 3a relative to the adjacent linings 5A of the clutch disc 5. Overheating could affect the operation of the bearing 6.

The energy storing elements 10 of the damper 9 are arcuate coil springs which are installed in the radially outer portion or compartment 12 of an annular chamber 11 disposed radially outwardly of the heads of the bolts 8 and radially inwardly of the friction surface 3a of the flywheel 3. The coil springs 10 can be replaced with other types of springs (e.g., torsion springs) without departing from the spirit of the present invention. The chamber 11 is at least partially filled with a solid lubricant (such as graphite powder) or with a flowable lubricant, e.g., highly viscous oil or grease.

The primary flywheel 2 comprises a substantially radially extending main section 13 which, in accordance with a presently preferred embodiment, is made of metallic sheet material in a stamping or drawing machine. The main section 13 includes a radially inner portion 14 which is provided with the aforementioned holes or bores 7 for the shanks of the fasteners 8 (hereinafter called bolts for short). The radially inner part of the portion 14 carries a flange-like member 15 forming part of the input member of the damper 9. The radially extending portion 15a of the member 15 is provided with bores or holes in register with the bores or holes 7 of the radially inner portion 14 of the main section 13. The axially extending portion 15b of the member 15 is surrounded by the inner race 16 of the bearing 6. The outer race 17 of the bearing 6 is surrounded by and carries the secondary flywheel 3.

The radially outer portion 18 of the main section 13 extends to the left of the radially extending plane of the major part of the section 13, i.e., toward the prime mover which is assumed to be located to the left of the primary flywheel 2 (as viewed in FIG. 1) when the flywheel 2 is properly affixed to the output element of the prime mover. The radially outermost part of the portion 18 comprises two radially extending layers which overlie each other and constitute a starter gear 19. The shorter layer 20 of the starter gear 19 surrounds the adjacent portion of a mass 21 which, in the embodiment of FIG. 1, constitutes a separately produced part of the primary flywheel 2. The teeth of the starter gear 19 can be provided in the radially outermost portions of the layer 20 and the left-hand layer of the starter gear subsequent to completion of the main section 13 prior or subsequent to attachment of the mass 21 to the main section 13. The teeth of the gear 19 can be formed by removing material from the main section 13, e.g., in a milling or broaching machine. Alternatively, the teeth of the gear 19 can be formed by simply displacing some material of the layer 20 and the adjacent layer of the portion 18, e.g., in a stamping machine which is used to convert a sheet metal blank into the main section 13 of the primary flywheel 2. It is also possible to form the teeth of the gear 19 by removing some material from the portion 18 with one or more high-energy beams, such as laser beams. Irrespective of the selected mode of making the teeth of the starter gear 19, it is advisable to increase the hardness of the respective part of the radially outer portion 18 of the main section 13 so that the hardness of the material of the gear 19 exceeds the hardness of those parts of the section 13 which are located radially inwardly of the layer 20. For example, the material of the starter gear 19 can be hardened in an induction hardening or case hardening machine.

The purpose of the mass 21 is to increase the moment of inertia of the primary flywheel 2 and of the entire composite flywheel 1. The illustrated mass 21 is an annular body of sheet material and includes a radially outermost axially extending tubular portion 22 and two radially extending washer-like portions 23 and 24. Such configuration of the portions 22 to 24 imparts to the mass 21 a substantially L-shaped cross-sectional outline. The making of the mass preferably involves suitable shaping or deformation of an originally flat blank of metallic sheet material, for example, in a manner as disclosed in the German patent application No. P 43 15 209 corresponding to U.S. patent application Ser. No. 08/230,910, filed Apr. 21, 1993. This German patent application discloses one presently preferred mode of making a starter gear 19 by appropriate deformation of a metallic blank. The disclosures of the German patent application No. P 43 15 209 corresponding to U.S. patent application Ser. No. 08/230,910, filed Apr. 21, 1993 and of all other German and other patent applications referred to in this specification and/or of the corresponding patent applications and/or patents in countries other than the German Federal Republic are incorporated herein by reference.

The junction 25 between the portions 22 and 24 of the mass 21 is adjacent and is welded to the layer 20 of the starter gear 19. The configuration of the mass 21 is preferably selected in such a way that the primary flywheel 2 can be readily installed in a casing or housing which receives the composite flywheel 1, e.g., in a bell-shaped transmission case, and that the composite flywheel does not touch the case.

The portion 22 of the mass 21 extends from the junction 25 in parallel with the axis X—X and away from the prime mover and the main section 13 of the flywheel 2. The junction 25 is defined by a suitably bent part 22a of the portion 22, and the part 22a merges into the radially outer part of the portion 24. The radially innermost part 24a of the portion 24 merges into the portion 23 of the mass 21. The part 24a is shifted to the right of the radial plane of the major part of the portion 24, i.e., toward the secondary flywheel 3, and abuts the adjacent radially innermost part of the portion 23. The radially outermost part of the portion 23 is located radially outwardly of the part 24a of the portion 24 but does not actually touch the internal surface of the tubular portion 22.

The part 22a of portion 22 is bonded to the main section 13 (and more specifically to the portion 18 and the starter gear 19) by an annulus of welded seams 27 which are in register with windows 26 in the portion 18.

The member 15 of the damper 9 is centered on and is connected to the portion 14 of the main section 13 of the primary flywheel 2. FIG. 1 shows a ring-shaped seat 28 forming part of the member 15 and extending to the left into the centrally located opening of the main section 13. Alternatively, or in addition to the seat 28, the means for centering the member 15 on and for non-rotatably connecting the member 15 to the main section 13 can comprise a set of protrusions extending from the plane of the central or radially inner portion of the member 15 into complementary recesses or holes or sockets of the portion 14. The protrusions can be formed by depressing selected portions of the right-hand side of the radially inner part of the member 15.

A second seat 29, radially inwardly of the seat 28 on the member 15 serves to center the member 15, the portion 14 of the main section 13 and hence the entire primary flywheel 2 (together with the friction clutch 4 and damper 9) directly on the rotary output element of the prime mover.

The radially outermost part 15c of the member 15 is located radially outwardly of the part 15a and includes a set of arms 34 which extend into the spaces between the end convolutions of the neighboring coil springs 10 constituting the energy storing elements of the damper 9. The part 15c is configured in such a way that its arms 34 are located in a common plane extending at right angles to the axis X—X and to the right of the plane of the portion 15a of the member 15. The radially outermost part 15c of the member 15 is affixed to the radially outermost part 31c of a second flange like member 30 which, together with the member 15, constitutes a composite input member of the damper 9. When the primary flywheel 2 is driven by the output element of a prime mover, the members 15 and 30 share such movement and transmit torque to the adjoining springs 10 of the damper 9. The radially outermost part 31c of the member 30 is also provided with radially outwardly extending arms 35 each of which registers with one arm 34 of the member 15 and extends into the space between the end convolutions of the neighboring springs 10.

The connection between the radially outermost parts 15c, 31c of the members 15 and 30 can be established by bonding (e.g., welding) and/or by the provision of a form-locking connection. Thus, some material of the part 31c can be shifted in the direction of the axis X—X in order to penetrate into the adjacent side of the part 15c and/or vice versa.

The part 31c is located radially outwardly of a concave-convex part 31 which, in turn, merges into a substantially cylindrical part 32 radially inwardly of the springs 10. The part 32 of the member 30 merges into a radially inwardly extending part 33 which is provided with holes or bores in register with the holes 7 and abuts the adjacent side of the part 15a of the member 15. The right-hand side of the part 33 serves as an abutment for the heads of the bolts 8, not only when the flywheel 2 is already affixed to the output element of a prime mover but also in storage and/or during transport of the torque transmitting apparatus to the locale of use, e.g., in an automobile assembling plant.

The edge faces of the arms 34, 35 of the respective members 15, 30 are preferably configured in such a way that they conform to the adjacent sides of the end convolutions of the springs 10. Thus, the end face or edge face of each end convolution of each spring 10 can be disposed in a plane which includes the axis of the respective spring. It is not necessary to finish (e.g., by grinding) the free ends of the outermost convolutions so that their end faces or edge faces are located in planes extending at right angles to the axes of the respective springs 10 and including the axis X—X. This entails considerable savings in time and renders it possible to make the springs 10 by the simple expedient of separating sections of requisite length from a continuous helically convoluted body of springy material. Furthermore, the configuration of the edge faces of the arms 34, 35 can be such that the pitch of the outermost convolutions of the springs 10 is the same as the pitch of the adjacent intermediate convolutions of the springs 10. In other words, when the damper 9 is assembled, the pitch of each and every convolution of each spring 10 is at least substantially the same. This is desirable and advantageous because the springs 10 permit larger angular displacements of the flywheels 2 and 3 relative to each other. This will be appreciated by bearing in mind that the maximum length of each spring 10 in the unstressed condition is considerably greater than if the radially outermost convolutions were bent toward and were to abut the immediately adjacent convolutions. When the springs 10 are stressed during transmission of torque from the composite input member 15, 30 to a composite output member (including two walls 38, 46) of the damper 9, the outermost convolutions must undergo deformation prior to lying flush against the neighboring intermediate convolutions of the springs. Otherwise stated, each and every convolution of each spring 10 must undergo deformation relative to the adjacent intermediate convolution in order to transmit torque to the composite output member of the damper 9 before the springs undergo maximum compression so that they act as solid bodies extending between the neighboring composite arms 34, 35.

The just-discussed configuration of the arms 34 and 35, as well as of the end convolutions of the springs 10, is of advantage in the illustrated torque transmitting apparatus but can also be relied upon in the dampers of many other types of devices. Thus, such feature is deemed to constitute a patentable improvement in the improved torque transmitting apparatus as well as per se.

The illustrated constituents 15, 30 of the composite input member of the damper 9 are assumed to be made of metallic sheet material. However, it is equally possible to replace the members 15, 30 with forgings or sintered members or to replace the members 15, 30 with a one-piece member which is a forging, a casting, a deformed blank of metallic sheet material or a part made of sintered material.

The arms 34 and/or 35 of the members 15 and 30 (or of the aforediscussed substitutes for and/or modifications of such members) can be configured and dimensioned in such a way that they prevent any angular displacements of the springs 10 about their respective axes, i.e., from turning in the compartment 12 of the chamber 11. Such configuration of the arms 34 and/or 35 ensures that the initial orientation of the springs 10 in the compartment 12 remains unchanged, i.e., that the orientation always corresponds to that selected in the plant in which the damper 9 is assembled. Therefore, the initially established optimal engagement between the edge faces of the arms 34, 35 and the neighboring end convolutions of the springs 10 remains unchanged during the entire useful life of the damper 9. This, in turn, enables the springs 10 to absorb all or nearly all fluctuations of the angular positions of the flywheels 2 and 3 relative to each other.

The end convolutions of the springs 10 are further engaged by the arms 36 and 37 which are respectively provided on the aforementioned walls 38, 46 forming part of or constituting a composite output member of the damper 9. The wall 38 is made of a blank of metallic sheet material and surrounds the outer race 17 of the antifriction bearing 6. In addition to providing arms 36, the wall 38 further serves to support, to at least partially confine and to transmit torque to the secondary flywheel 3, as well as to cooperate with the flywheel 3 to limit the magnitude of torque which the clutch disc 5 can transmit to a rotary input element in the engaged condition of the friction clutch 4.

The radially inner portion of the wall 38 is provided with a part or shoulder 39 which extends in parallel with the axis X—X and has an inner diameter such that it can snugly receive and confine the outer race 17 of the bearing 6 as well as the closure or cap 6a. A portion 40 of the shoulder 39 has an inner diameter smaller than the outer diameter of the outer race 17 so that it constitutes a stop against changes of axial positions of the bearing 6 and wall 38 relative to each other.

A portion 41 of the wall 38 extends from the shoulder 39 radially outwardly and away from the main section 13 of the primary flywheel 2, preferably at a substantially constant angle so that it constitutes a hollow conical frustum having its base at the part 40 of the shoulder 39. The portion 41 is provided with openings 42 which are dimensioned to snugly receive the heads of the corresponding bolts 8 as well as to permit such heads to pass therethrough toward the adjacent side of the portion 33 of the flange-like member 30. The distance of the openings 42 from the left-hand side of the main section 13 of the flywheel 2 is preferably selected in such a way that the heads of the bolts 8 are at least partially confined in the aligned openings 42 when the tips of the shanks of the bolts do not project to the left and beyond the main section 13. The axes of the bolts 8 are then at least substantially parallel to the axis X—X so that the shanks of such bolts can be readily driven into the respective tapped bores or holes of an output element, e.g., a crankshaft or a camshaft forming part of a combustion engine in a motor vehicle.

The radially outer part of the frustoconical portion 42 of the wall 38 merges into a concavo-convex portion 43 having a concave internal surface which preferably closely conforms to the outlines of adjacent portions of the springs 10. The dimensions of the portion 43 are selected in such a way that its internal surface conforms to and thus properly positions the adjacent portions of the springs 10 against undesirable displacement in the compartment 12 of the chamber 11 in two directions, namely radially as well as in the direction of the axis X—X. The portion 43 merges into a radially outwardly extending portion 44 which abuts and is non-rotatably connected with a radially outwardly extending portion 45 of the wall 46.

The wall 46 is installed between the flange-like member 38 and the main section 13 of the primary flywheel 2, as seen in the direction of the axis X—X. The connection between the portions 44, 45 of the walls 38, 46 includes deformed tongues or lugs 46a of the portion 45 which cause a sealing element 47 (e.g., an O-ring) to be stressed between the portions 44, 45 and to thus seal the radially outermost part of the compartment 12 from the surrounding atmosphere.

That part of the wall 46 which is located radially inwardly of the radially extending portion 45 overlies a portion of the sealing element 47 and thereupon extends away from the main section to be overlapped by the adjacent part of the wall 38 close to the radially outermost portion of the chamber 12. The wall 46 further includes a concavo-convex portion having a concave inner side which closely follows the adjacent portions of the springs 10 opposite the portion 43 of the wall 38. Those parts of the walls 38 and 46 which are immediately adjacent the sealing element 47 preferably directly abut each other so as to establish a seal which prevents the lubricant from escaping from the radially outermost portion of the compartment 12 even if the sealing element 47 becomes damaged or destroyed. Furthermore, the just mentioned parts of the walls 38, 46 ensure that the two walls are properly centered relative to each other and, therefore, also relative to the flywheel 3 because the latter is centered by the wall 46 radially outwardly of the wall 38.

The wall 46 further comprises a radially innermost portion 48 which extends in part axially toward the adjacent portion of the main section 13 and cooperates with the part 15a of the member 15 and a sealing element 49 to seal the adjoining portion of the chamber 11 from the surrounding atmosphere. The illustrated sealing element 49 is a diaphragm spring which is installed in axially stressed condition so that its radially outer portion sealingly engages the portion 48 of the wall 46 and its radially inner portion sealingly engages the portion 15a of the member 15. This sealing element can be centered by the portion 48 and/or by the portion 15a.

A further sealing element 50, such as a diaphragm spring, is installed in axially stressed condition so that it radially outer part bears against the portion 31 of the member 30 and that its radially innermost portion bears upon the adjacent portion of the wall 38. The sealing element 50 can be centered by the wall 38 and/or by the member 30 and its purpose is to seal the chamber 11 in the clearance between the wall 38 and the flange-like member 30. It is also possible to install the sealing element 50, or to install a further sealing element, between the portion 32 of the member 30 and the adjacent non-apertured portion of the wall 38.

The sealing element 50 is centered by an annulus of protuberances 51 forming part of the wall 38 and being surrounded by the radially innermost portion of the element 50. The protuberances 51 are or can be obtained by displacing the corresponding portions of the wall 38 in a direction axially of and toward the main section 13 of the primary flywheel 2. The set of discrete protuberances 51 can be replaced with a circumferentially complete rib or bead or by a set of arcuate protuberances together forming a circular centering device for the radially innermost portion of the sealing element 50.

The radially outermost portion of the wall 46 centers and carries the secondary flywheel 3 radially outwardly of the connection between the walls 38 and 46. As already mentioned above, the connection between the walls 38 and 46 is established by tongues or lugs 46a which are of one piece with the portion 45 and extend through and beyond slots provided therefor in the radially outermost portion 44 of the wall 38. The tips of the lugs 46a are bent radially inwardly to overlie the right-hand side of the portion 44.

The portion 45 of the wall 46 extends radially outwardly along the left-hand side of the flywheel 3 and merges into a cylindrical or tubular portion 45a extending axially of and away from the primary flywheel 2 to surround a portion of the periphery of and to thus center the flywheel 2 relative to the wall 46.

The making of slots in the portion 45 of the wall 46 in order to provide the tongues or lugs 46a permits highly desirable circulation of air and cooling of the portions 44 and 45 to thus considerably reduce the transfer of heat from the secondary flywheel 3 to the portions 44, 45 and thence to those portions of the walls 38, 46 which define the chamber 11 and cooperate with the portion 32 of the member 30 as well as with the sealing elements 47, 49 and 50 to prevent escape of lubricant from the chamber 11. Overheating of lubricant in the chamber 11 is undesirable.

In addition to the slots at the deformed lugs 46a, the portion 45 of the wall 46 can be provided with additional openings 45b (or each slot can form part of one of the openings 45b) which constitute passages for desirable extensive circulation of air along those parts which define the chamber 11, i.e., particularly along the walls 38, 46 which together form part of an enclosure defining the chamber 11 and its compartment 12. The openings or passages 45b preferably extend radially outwardly within the entire frustoconical part of the portion 45, namely within that part which slopes radially outwardly and away from the flywheel 2 in a direction from the lugs 46a to the left-hand side of the flywheel 3.

The portions 44 and 45 of the walls 38 and 46 are disposed at the left-hand side of the flywheel 3, i.e., at the side which is remote from the friction surface 3a. This is desirable on the ground that any lubricant which might escape from the compartment 12 along the sealing element 47 will tend to advance toward the primary flywheel 2, i.e., away from the friction surfaces 3a, 52a and from the friction linings 5A of the clutch disc 5. Thus, the friction clutch 4 can continue to operate properly even if some lubricant is permitted to escape from the compartment 12 of the chamber 11.

The primary flywheel 2, the friction clutch 4 with its flywheel (counterpressure plate) 3 and its clutch disc 5, and the damper 9 together constitute a module which is preferably assembled at the manufacturing plant in a condition ready for storage, shipment to the locale of use and installation between the output element of a prime mover and the input element of a driven unit. This saves much time and simplifies the task of the persons or automatons which are used to install the torque transmitting apparatus, e.g., in motor vehicles. For example, the assembly of the constituents 1, 4 and 9 into a module renders it unnecessary to center the clutch disc between the flywheel 3 and the pressure plate 52 in the automobile assembling plant, to install the clutch disc between the friction surfaces 3a and 52a, to affix the clutch 4 to the composite output member (including the walls 38, 46) of the damper 9, to introduce a centering mandrel which is necessary for the assembly of the constituents of a conventional torque transmitting apparatus in the assembly plant, to insert fasteners which are used to secure the primary flywheel of the composite flywheel to an output element, and to extract the centering mandrel upon completion of the attachment of the primary flywheel to the output element.

It is presently preferred to make the bolts 8 component parts of the aforediscussed module, i.e., to insert the shanks of the bolts into the holes or bores 7 at the locus of assembly of the module and to maintain the bolts in such orientation that their shanks are compelled to enter the aligned tapped bores or holes of the output element of the prime mover when the heads of the bolts are rotated subsequent to centering of the module by properly positioning the seat 29 relative to the output element. The shanks of the bolts 8 can be releasably held or locked in positions parallel with the axis X—X by suitable yieldable inserts (not specifically shown) which are provided in the holes 7 and/or in the aligned holes of the member 15 and/or in the aligned holes of the member 30 and/or in the aligned openings 42 so as to maintain the shanks and/or the heads of the bolts 8 in requisite positions for engagement of the heads by the working end of a rotary tool (not shown) which is caused to advance into engagement with successive heads to drive the shanks of the bolts 8 into the output element. The yieldable inserts can be destroyed or expelled or simply deformed and moved out of the way in response to rotation of the heads for the purpose of driving the shanks of the bolts 8 into the output element.

The clutch disc 5 of the module is maintained in such angular position relative to the main section 13 of the primary flywheel 2 that its openings 53 are in accurate alignment with the holes 7. This can be readily accomplished by causing or permitting the clutch spring 54 to bias the pressure plate 52 toward the flywheel 3 so that the friction linings 5A are clamped between the friction surfaces 3a and 52a in the optimum angular position of the clutch disc relative to the primary flywheel.

The openings 53 can be dimensioned in such a way that they are too small to permit the heads of the bolts 8 to pass therethrough. This constitutes an additional safety feature which ensures that, once installed in the module in a manner as shown in FIG. 1, the bolts 8 cannot be lost in storage, transit and/or during mounting of the module on a rotary output element because the heads of the bolts cannot escape through the openings 53. This feature is shown in FIG. 1, i.e., the dimensions of the illustrated opening 53 are such that the head of the illustrated bolt 8 cannot pass therethrough.

The clutch spring 54 is also designed in such a way that it permits the working end of a rotary tool to pass therethrough into driving engagement with the heads of successive bolts 8. For example, the slots between certain prongs 54a of the clutch spring 54 can include enlarged portions to provide openings which register with the openings 53. This can be accomplished by removing certain portions of selected prongs 54a or by simply omitting certain prongs in their entirety.

The housing 57 of the friction clutch 4 has a radially extending portion 65 which can be said to constitute a bottom wall or end wall, and an axially extending portion 64 which surrounds the pressure plate 52 and the circumferentially complete radially outer portion or main portion of the spring 54. The main portion of the spring 54 bears upon the pressure plate 52, at least in the engaged condition of the clutch 4. The clutch spring 54 is tiltable between two seats 55 and 56 here shown as wire rings one of which is interposed between the clutch spring and the bottom wall 65 and the other of which is adjacent the left-hand side of the clutch spring, as viewed in FIG. 1. The seats 55, 56 are held in requisite positions by rivets (not shown) or by deformed portions of the bottom wall 65. FIG. 1 shows one deformed portion or lug 58 of the bottom wall 65; the illustrated lug 58 extends substantially axially of the pressure plate 52 radially inwardly of the seat 55, through a slot between the neighboring prongs 54a of the clutch spring 54, along the radially inner side of the seat 56 and thereupon along the left-hand side of the seat 56 and preferably at least slightly back toward the bottom wall 65 so as to ensure that the seats 55, 56 are properly centered on the bottom wall 65 and establish a fulcrum for the main portion of the clutch spring 54.

The radially inner portion of the seat 55 abuts the lugs 58 and the radially outer side of this seat is centered by a circular protuberance 59 which preferably constitutes a deformed or axially shifted portion of the bottom wall 65. The protuberance 59 can constitute a circumferentially complete displaced portion of the bottom wall 65 or it can consist of a series of discrete arcuate sections or a series of discrete stud-shaped projections of one piece with or attached to the bottom wall 65.

As can be seen in FIG. 1, the configuration of a radially inner portion of the right-hand side of the pressure plate 52 is such that it rather closely conforms to the outlines of the lugs 58. The configuration of the pressure plate 52 can be such that it is provided with a circumferentially complete groove deep enough to receive the seat 56 as well as the left-hand portions of the lugs 58. Alternatively, the groove can be configurated in such a way that it includes alternating shallower portions for the seat 56 and deeper portions for the lugs 58.

The means for transmitting torque between the housing 57 and the pressure plate 52 in such a way that the pressure plate is compelled to rotate with, but is free to move axially relative to, the housing includes a set of leaf springs 60 each having one end portion secured to the housing by a rivet (not shown) and the other end portion secured to the pressure plate by a rivet 61. The pressure plate 52 is provided with extensions 62 projecting through the slots between certain prongs 54a of the clutch spring 54 and carrying the rivets 61. FIG. 1 shows that the extensions 62 are disposed radially inwardly of the friction linings 5A of the clutch disc 5, i.e., radially inwardly of the friction surfaces 3a and 52a. Certain slots of the clutch spring 54 are or can be enlarged so as to provide room for the extensions 62. An important advantage of the just-described mode of coupling the pressure plate 52 to the housing 57 of the friction clutch 4 is that the leaf springs 60 are located at the outer side of the bottom Wall 65. This not only simplifies the attachment of the housing 57 and the pressure plate 52 to each other but also contributes to the compactness of the friction clutch 4, particularly in the axial direction of the torque transmitting apparatus.

The feature, whereby the leaf springs connect the pressure plate to the housing of a friction clutch in such a way that the springs are disposed at the exposed side of the bottom wall of the housing, is considered a patentable innovation in the improved torque transmitting apparatus as well as per se. In other words, such a feature can be embodied in friction clutches irrespective of whether or not such clutches are assembled with composite or single flywheels and irrespective of the nature of the prime mover which is selected to drive the counterpressure plate, the housing and the pressure plate of the clutch.

In lieu of enlarging certain slots of the clutch spring 54 for the purpose of providing room for the extensions 62 of the pressure plate 52, it is also possible to simply omit certain prongs 54a in their entirety.

The prongs 54a of the clutch spring 54 are configurated in such a way that they together form an array, one side of which (namely the left-hand side as viewed in FIG. 1) has a configuration conforming to that of the adjacent portion of the annular carrier forming part of the clutch disc 5 and supporting the friction linings 5A, at least when the friction clutch is engaged. The corresponding position of one of the prongs 54a is indicated in FIG. 1 by broken lines. This also contributes to compactness of the torque transmitting apparatus.

In addition to the openings 42 in the wall 38 of the enclosure for the springs 10 of the damper 9, the torque transmitting apparatus can be provided with further channels or passages for the flow of a coolant (normally air) along selected paths to prevent overheating of the bearing 6, of the secondary flywheel 3, of the lubricant in the chamber 11 and of certain other constituents of the apparatus. Thus, suitably distributed passages (not specifically shown) can be provided in the bottom wall 65 and/or in the axially extending portion 64 of the housing 57. FIG. 1 shows one of at least two passages 5a in the carrier of the clutch disc 5 and one of preferably two or more passages 63 in the main section 13 of the primary flywheel 2. One or more additional passages or channels can be provided in the secondary flywheel 3 in order to even further reduce the likelihood of overheating the secondary flywheel so that the thus generated heat could cause an excessive reduction of the viscosity of lubricant in the compartment 12 of the chamber 11 if the chamber contains a supply of highly viscous lubricant, preferably in the form of grease. Overheating of one or more constituents of the primary flywheel 2 and/or of the power train between the flywheel 2 and the input element of the unit which is driven by the clutch disc 5 when the clutch 4 is engaged could shorten the useful life of the entire apparatus.

Additional dissipation of heat can be achieved by enlarging the areas of certain surfaces of selected constituents of the torque transmitting apparatus. For example, the left-hand side of the secondary flywheel 3, the right-hand side of the pressure plate 52 and/or one or both sides of the main section 13 of the primary flywheel 2 can be enlarged by grooving, by the provision of protuberances, by the provision of ribs and/or by the selection of other configurations which enable the respective constituents to dissipate large amounts of heat.

Still further, it is desirable to provide one or more constituents of the torque transmitting apparatus with vane- or blade-like portions so that, when the apparatus is in use and the primary flywheel 2 is driven by the output element of the prime mover to transmit torque to the damper 9 which, in turn, drives the flywheel 3 of the friction clutch 4, the constituent or constituents having one or more vanes or blades act not unlike the rotors of a blower or fan to thus further promote the circulation of air. For example, one or more vanes or blades can be provided on the carrier of the clutch disc 5 adjacent each opening or passage 5a to promote the flow of air toward the adjacent portion of the wall 38 and thereupon into the passages 45b of the wall 46.

Figure 2:
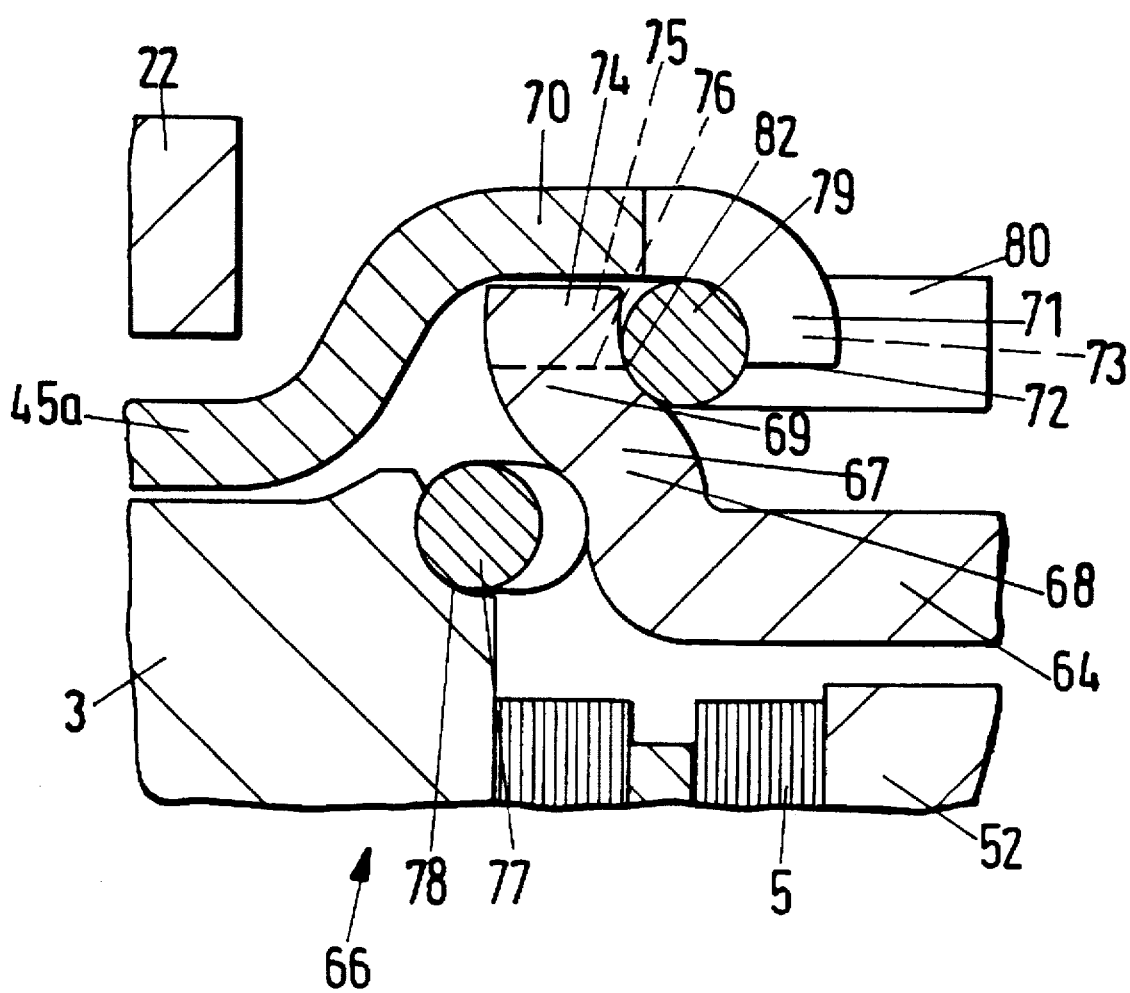
FIG. 2 is an enlarged view of a detail showing the coupling means in the apparatus of FIG. 1.

FIG. 2 shows the details of a device 66 which constitutes a means for separably coupling two selected components of the power train between the primary flywheel 2 and the unit which is driven by the hub of the clutch disc 5. Such coupling device is provided in addition to the friction clutch 4, i.e., in addition to the parts 3, 52, 54 and 5 which can be said to constitute a coupling which is active when the clutch 4 is engaged so that the parts 3 and 52 can transmit torque to the friction linings 5A.

The coupling device 66 of FIGS. 1 and 2 is designed in such a way that it can establish a separable connection between the components 64 and 45a, i.e., between a portion of the clutch housing 57 and a portion of the wall 46. When the components 45a and 64 are separated from each other, the clutch disc 5 can be inspected and replaced, if necessary, with a fresh clutch disc having a set of intact friction linings 5A. Such access to the clutch disc 5 can be gained without dismantling that part of the apparatus which includes the primary flywheel 2, the damper 9 and the secondary flywheel 3 and/or that part of the apparatus which includes the housing 57, the pressure plate 52 and the clutch spring 54. In other words, the clutch disc 5 can be inspected and replaced, if necessary, without even partial destruction of any other parts of the apparatus. In addition, it is possible to gain access to and inspect the friction surface 3a of the secondary flywheel 3 and/or the friction surface 52a of the pressure plate 52.

In accordance with an additional feature of the invention, the improved torque transmitting apparatus is provided with means for limiting the magnitude of torque which can be transmitted to the clutch disc 5 (and thence to the unit or units which receive torque from the hub of the clutch disc) in the engaged condition of the friction clutch 4. In accordance with still another feature of the invention, the torque limiting means forms part of or includes the coupling device 66. This, too, contributes to superior versatility and desirable compactness of the torque transmitting apparatus as seen in the direction of the axis X—X as well as in directions radially of such axis.

The torque limiting means of the apparatus which is shown in FIGS. 1 and 2 is or includes a slip clutch which permits, when necessary, an angular movement of the wall 46 of the output member of the damper 9 and the flywheel 3 of the friction clutch 4 relative to each other when the magnitude of torque which is being transmitted to the flywheel 3 exceeds a preselected value such as could cause damage to the enclosure for the springs 10 and/or to the friction clutch 4 and/or to the unit or units receiving torque from the clutch disc 5 in the engaged condition of the friction clutch. The magnitude of torque which is being transmitted by an apparatus operating between the camshaft or crankshaft of the combustion engine and the input shaft of the variable speed transmission in a motor vehicle is likely to fluctuate within a wide range, at least under certain circumstances. The purpose of the slip clutch which is constituted or includes or is provided in addition to the coupling device 66 ensures that the torque transmitting apparatus and/or the transmission is not damaged or destroyed under such circumstances.

The coupling device 66 of FIGS. 1 and 2 comprises a collar 67 which extends substantially radially outwardly at the free end of the axially extending (tubular or cylindrical) portion 64 of the clutch housing 57, namely at that axial end of the portion 64 which is nearer to the flywheels 2, 3 and to the prime mover. The collar 67 comprises two concavo-convex portions 68, 69. The concave side of the portion 68 faces toward the flywheels 2, 3 and the concave side of the portion 69 faces away from the flywheels.

The portion 45a, which is the radially outermost part of the portion 45 of the wall 46 and extends in parallel with the axis X—X along a part of the periphery of and beyond the secondary flywheel 3, includes an enlarged (larger-diameter) portion 70 whose inner diameter matches or approximates the inner diameter of the axially extending portion 22 of the mass 21. The portion 70 overlies (surrounds) the collar 67 and extends axially beyond the concavo-convex portion 69 in a direction away from the flywheels. The free end of the portion 70 is provided with a circular array of alternating tongues or teeth 71 and grooves or slots 73. The tongues 71 are bent radially inwardly to overlie a split ring 79 which forms part of the coupling device 66 and is installed between the tongues or teeth 71 and the radially outer concave-convex portion 69 of the collar 67. The extent to which the tongues or teeth 71 are flexed radially inwardly to overlie the ring 79 is such that the diameter of the circle formed by the end faces 72 of the members 71 is less than the maximum diameter of the collar 67. This ensures that the split ring 79 is reliably held between the portion 45a and the members 71 when the components 45a and 64 are to be coupled to each other.

The portion 69 of the collar 67 is provided with an annulus of alternating tongues or teeth 74 and grooves or slots or recesses 75. The deep-most portion of that slot 75 which is shown in FIG. 2 is denoted by the character 76. The width of the teeth 74 (as seen in the circumferential direction of the axially extending portion 70 of the wall 46) is less than the width of the slots 73. Furthermore, the width of the teeth 71 (as seen in the circumferential direction of the collar 67) is less than the width of the slots 75. The inner diameter of the annulus of teeth 71 at the end faces 72 is larger than the diameter of the annulus formed by the deep-most portions 76 of the slots 75 in the portion 70. Such dimensioning of the annulus of teeth 71 and the annulus of the deep-most portions 76 ensures that the portions 64 and 70 can be interfitted in a manner as shown in FIG. 2, namely that the teeth 71 are located to the right and the teeth 74 are located to the left of the split ring 79. One free end portion of the split ring 79 is shown at 80; this end portion is bent radially outwardly of the arcuate portion of the split ring in substantial parallelism with the axis X—X and away from the flywheels 2 and 3.

The coupling device 66 further comprises a corrugated ring-shaped spring 77 (hereinafter called elastic washer) which is stressed in the direction of the axis X—X and a portion of which extends into an annular socket or groove 78 provided in the radially outermost portion of the right-hand side of the secondary flywheel 3. The illustrated washer 77 is an endless wire ring having undulations which extend in the direction of its axis, i.e., in such a way that the washer is stressed in the axial direction when it is confined between the flywheel 3 and the concave side of the concave-convex portion 68 of the collar 67.

When properly inserted, the arcuate portion of the split ring 79 is confined between the portion 69 of the collar 67 and the teeth 71 of the portion 70. At such time, the portion 68 of the collar 67 cooperates with the flywheel 3 to maintain the washer 77 in the axially stressed condition so that the washer prevents accidental removal of the split ring 79 and the resulting separation of the components 45a, 64 of the coupling 66 from each other.

The end portions 80 of the split ring 79 extend parallel with the axis X—X (i.e., in a direction at right angles to the plane of the arcuate portion of the split ring) and through the adjacent slots 73 between the neighboring teeth 71. This ensures that the ring 79 cannot rotate relative to the portion 45a of the wall 46.

The method of assembling the improved torque transmitting apparatus can be carried out in the following way: The secondary flywheel 3 is inserted into the dished radially outermost part of the wall 46 so that its peripheral surface is close to or actually engages the internal surface of the portion 45a. At such time, the walls 38, 46 of the output member of the damper 9 are already assembled with the springs 10 and the composite input member 15, 30 of the damper, and the latter is already assembled with the primary flywheel 2. The next step involves the insertion of the clutch disc 5 so that its friction linings 5A are adjacent the friction surface 3a of the flywheel 3, and the resilient washer 77 is moved to the position shown in FIGS. 1 and 2, i.e., so that it partially extends into the socket 78 of the flywheel 3. The housing 57 of the friction clutch 4 is already assembled with the pressure plate 52, seats 55, 56 and clutch spring 54, and such assembly is then moved toward the flywheel 3 and clutch disc 5 so that the collar 67 moves axially toward the primary flywheel 2 beyond the teeth 71 of the axially extending portion 70. Such movement of the housing 57 toward the flywheel 2 results in axial stressing of the clutch spring 54 and of the elastic washer 77. The split ring 79 is inserted in the next step to thus ensure that the spring 54 anti the washer 77 remain in axially stressed condition. This completes the assembly of the coupling device 66. The washer 77 and the clutch spring 54 cooperate to maintain the surface 81 at the left-hand side of the secondary flywheel 3 in pronounced frictional engagement with the adjacent side of the radially extending portion 45 of the wall 46. In other words, the slip clutch including the flywheel 3 (with its friction surface 81) and the portion 45 of the wall 46 is operative and can yield to permit rotation of the wall 46 (and hence of the flywheel 2) relative to the flywheel 3 when the magnitude of torque which is being transmitted by the damper 9 from the flywheel 2 to the flywheel 3 exceeds a preselected value.

When the friction clutch 4 is engaged, the bias of the clutch spring 54 in the direction of the axis X—X to urge the flywheel 3 against the portion 45 of the wall 46 is assisted by the bias of the washer 77 which reacts against the housing 57 and urges the surface 81 of the flywheel 3 against the portion 45 of the wall 46. When the clutch 4 is disengaged, the flywheel 3 is biased against the portion 45 of the wall 46 only by the elastic washer 77. It is possible to design the washer 77 in such a way that it applies forces to the flywheel 3 that act radially inwardly toward the axis X—X so that the flywheel 3 is automatically centered relative to the portion 64 of the housing 57. Alternatively, it is possible to replace the illustrated washer 77 with an elastic element which biases the secondary flywheel 3 radially and axially, or to provide an additional resilient element which serves to center the flywheel 3 in the portion 64 of the clutch housing 57.

It is further possible to maintain the clutch spring 54 in a position corresponding to that when the friction clutch 4 is disengaged while the housing 57 is being assembled with the portion 45, 45a 70 of the wall 46. Thus, it is then necessary to overcome only the bias of the washer 77 during assembly of the coupling device 66. Such mode of assembling the coupling device 66 and the torque transmitting apparatus simplifies the task of inserting the split ring 79 because the components 67 and 70 of the coupling device 66 are urged axially and away from each other only by the elastic washer 77.

In order to deactivate the coupling device 66, e.g., in order to gain access to the friction linings 5A of the clutch disc 5, it is merely necessary to urge the components 67 and 70 of the coupling device axially and toward each other with a force which is sufficient to overcome the bias of the clutch spring 54 and the elastic washer 77. The split ring 79 can then be removed from the space between the portion 69 of the collar 67 and the teeth 71 of the component 70. For example, the bent end portions 80 of the split ring 79 can be engaged by the jaws of pliers or any other suitable tool so as to reduce the diameter of the arcuate portion of the split ring. The arcuate portion of the split ring 79 can then be removed in the direction of the axis X—X, i.e. away from the flywheel 3 and through the ring-shaped space between the end faces 72 of the teeth 71 and the external surface of the portion 64 of the clutch housing 57. The teeth 74 are then free to pass through the respective slots 73 to complete the separation of the components 67 and 70 of the device 66 from each other.

The torque transmitting apparatus of FIGS. 1 and 2 is assembled in such a way that the wall 46 of the output member of the damper 9 is not form-lockingly connected to the part 3 and/or 5 of the friction clutch 4. The connection is a force-locking connection in that the friction surface 81 of the flywheel 3 is biased (by the washer 77 alone or by the washer 77 in combination with the clutch spring 54) against the adjacent side of the radially extending portion 45 of the wall 46. Such force-locking connection constitutes the aforediscussed slip clutch serving to limit the magnitude of torque which the primary flywheel 2 and the damper 9 can transmit to the secondary flywheel 3, i.e., to the counter-pressure plate of the friction clutch 4 while the latter is engaged. A second friction surface 82 of the slip clutch is provided on the arcuate portion of the split ring 79 and/or on the portion 69 of the collar 67, and such friction surface further ensures that the magnitude of the torque to be applied to the clutch disc 5 in the engaged condition of the clutch 4 cannot exceed a certain value such as could result in damage to or in destruction of one or more parts of the torque transmitting apparatus and/or one or more parts of the unit or units receiving torque from the hub of the clutch disc 5.

The magnitude of the torque which can be transmitted from the primary flywheel 2 and the damper 9 to the secondary flywheel 3 (i.e., to a part of the friction clutch 4) can be determined in advance in a number of ways. For example, the magnitude of the maximum transmissible torque can be determined by appropriate selection of the characteristics of the clutch spring 54 and/or elastic washer 77. In addition or in lieu of the selected bias of the spring 54 and/or washer 77, the magnitude of the transmitted or transmissible torque can be determined by appropriate selection of the materials of the parts (45, 3) at the friction surface 81, by appropriate finish of the parts which engage each other at the surface 81, by appropriate selection of the materials of the parts (69, 71) at the friction surface 82 and/or by appropriate selection of the finish of parts which abut each other at the surface 82.

In addition to the provision of the coupling 66 and one or more slip clutches, the improved torque transmitting apparatus exhibits the important advantage that the diameters of the friction surfaces 3a and 52a are large in spite of the compactness of the apparatus in directions radially of the axis X—X. This is achieved in that the chamber 11 for the energy storing elements 10 of the damper 9 is located radially inwardly of the friction linings 5a of the clutch disc 5. Substantial savings in space requirements in the direction of the axis X—X are achieved by positioning the secondary flywheel 3 at the same axial distance from the main section 13 of the primary flywheel 2 as the energy storing elements 10 of the damper 9 and by causing the prongs 54a of the clutch disc 54 to conform to the outline of the adjacent side of the clutch disc 5 in the disengaged condition of the friction clutch 4. The compactness of the apparatus in the direction, as well as radially, of the axis X—X renders it possible to install such apparatus in nearly all kinds of motor vehicles including those wherein the output element of the prime mover extends transversely of the direction of forward movement of the conveyance.

A further important advantage of the improved apparatus is that, in spite of the surprisingly small number of its parts, it is designed to afford convenient access to the clutch disc 5 and/or to the flywheel 3 and/or to the pressure plate 52 and clutch spring 54 by the simple expedient of deactivating the coupling device 66. The provision of one or more slip clutches which prevent the transmission of excessive torque contributes to the safety of the torque transmitting apparatus without contributing to its bulk because at least one of the slip clutches can form part of the coupling device 66 or vice versa.

The feature that the parts of the improved apparatus can be assembled into a module which is ready to be affixed to the output element of a prime mover and which even carries, confines and properly orients the means for fastening the primary flywheel 2 to the output element, ensures that the module can be installed between the prime mover and one or more torque receiving units in a simple and time saving manner. Additional savings in time and material can be achieved by designing at least a certain number of constituents of the improved apparatus (such as the main section 13 of the primary flywheel 2, the mass 21 of the flywheel 2, the starter gear 19 of the flywheel 2, the members 15, 30 of the damper 9, the walls 38, 46 of the enclosure which defines the chamber 11, and the end convolutions of the energy storing elements 10) with a view that the constituents can be mass-produced in available machines and in a manner (e.g., by broaching, stamping, etc.) to avoid unnecessary ecological problems.

The improved apparatus is designed to transmit torque from the output element of the prime mover to the primary flywheel 2, thence to the composite input member 15, 30 of the damper 9, thence to the energy storing elements 10 of the damper, to the composite output member 38, 46 of the damper, to the secondary flywheel 3 (by way of the slip clutch including the friction surface 81), to the clutch disc 5 (in the engaged condition of the clutch 4) and to the unit or units receiving torque from the hub of the clutch disc.

Figure 3:
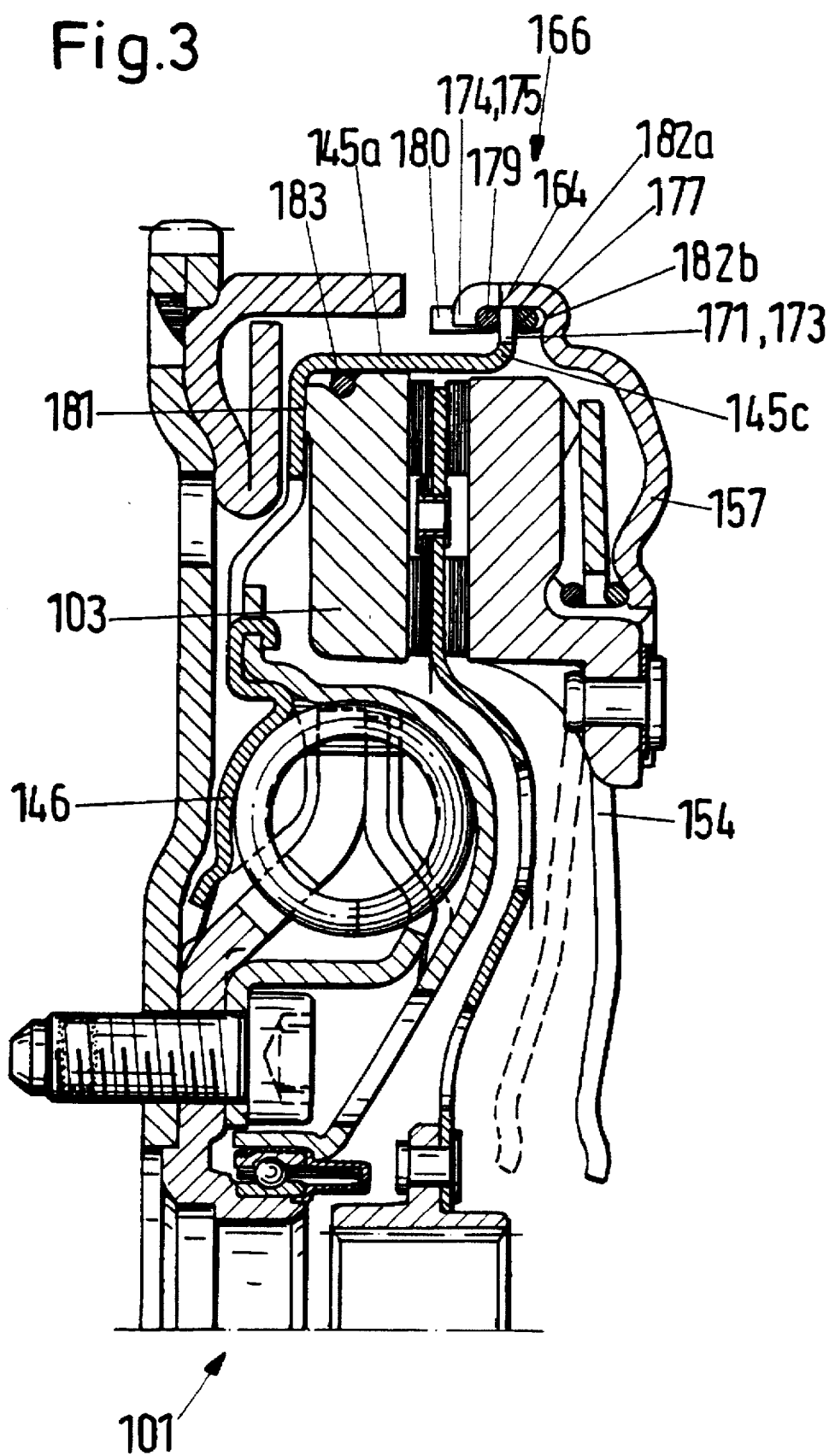
FIG. 3 is a fragmentary axial sectional view of a second torque transmitting apparatus.

FIG. 3 shows certain parts of a modified torque transmitting apparatus. All such parts of the apparatus of FIG. 3 which are identical or clearly analogous to the corresponding parts of the apparatus of FIGS. 1 and 2 are denoted by similar reference characters plus 100.

The coupling device 166 in the apparatus of FIG. 3 comprises a radially outwardly extending collar 145c which is of one piece with the axially extending portion 145a of the wall 146 and is provided with an annulus of teeth 171 alternating with tooth spaces or slots 173. The collar 145c is overlapped (surrounded) by the axially extending portion 164 of the clutch housing 157. The portion 164 is provided with an annulus of partly radially inwardly extending teeth 174 alternating with tooth spaces or slots 175. The elastic washer 177 of the coupling device 166 is stressed in the direction of the common axis of the flywheels constituting the flywheel assembly 101 by being installed between the collar 145c and the portion 164 of the clutch housing 157. The split ring 179 (e.g., a wire ring with end portions 180 bent in to a parallel position with regard to the common axis of the flywheels and extending toward the primary flywheel) is installed between the collar 145c and the radially inwardly extending teeth 174. It will the seen that the positions of the components 145a, 164 of the coupling device 166 are reversed, i.e., the component 145a (whose collar 145c is overlapped by the component 164) is provided on the wall 146 whereas the component 164 forms part of the clutch housing 157.

The apparatus of FIG. 3 further comprises an additional undulate elastic washer 183 which is stressed in the radial direction of the composite flywheel 101 and operates between the internal surface of the portion 145a of the wall 146 and the peripheral surface of the secondary flywheel 103.

The composite slip clutch of the apparatus of FIG. 3 comprises three friction surfaces 181, 182a and 182b. The friction surface 181 is disposed between the left-hand side of the flywheel 103 and the right-hand side of the adjacent portion of the wall 146. The flywheel 103 and the wall 146 are biased against each other by the clutch spring 154 (at least when the friction clutch is engaged). The friction surface 182a is disposed between the elastic washer 177 and the collar 145c, and the friction surface 182b is disposed between the elastic washer 177 and the portion 164 of the housing 157. The bias at the friction surfaces 182a and 182b is determined by the extent of axial stressing of the elastic washer 177. The bias at the friction surface 182b can be less than at the friction surface 182b or vice versa. Furthermore, such bias can be greater or less than at the friction surface 181.

The elastic washer 183 centers the secondary flywheel 103 within the surrounding portion 145a of the wall 146. Such washer can be replaced by or utilized jointly with leaf springs (not shown) which are interposed between the secondary flywheel 103 and the portion 145a of the wall 146 and extend in the circumferential direction of the secondary flywheel. The stressing of the leaf springs is such that they are stressed in the radial direction of the flywheel 103.

It is further possible to replace the cylindrical portion 145a of the wall 146 with a polygonal portion (not shown) whose facets are in frictional engagement with the periphery of the flywheel 103 at a plurality of locations spaced apart from each other in the circumferential direction of the flywheel 103. The frictional engagement suffices to properly center the flywheel 103 in the polygonal portion replacing the portion 145a as well as to prevent undesirable axial shifting of the flywheel 103 relative to the wail 146.

Figure 4:
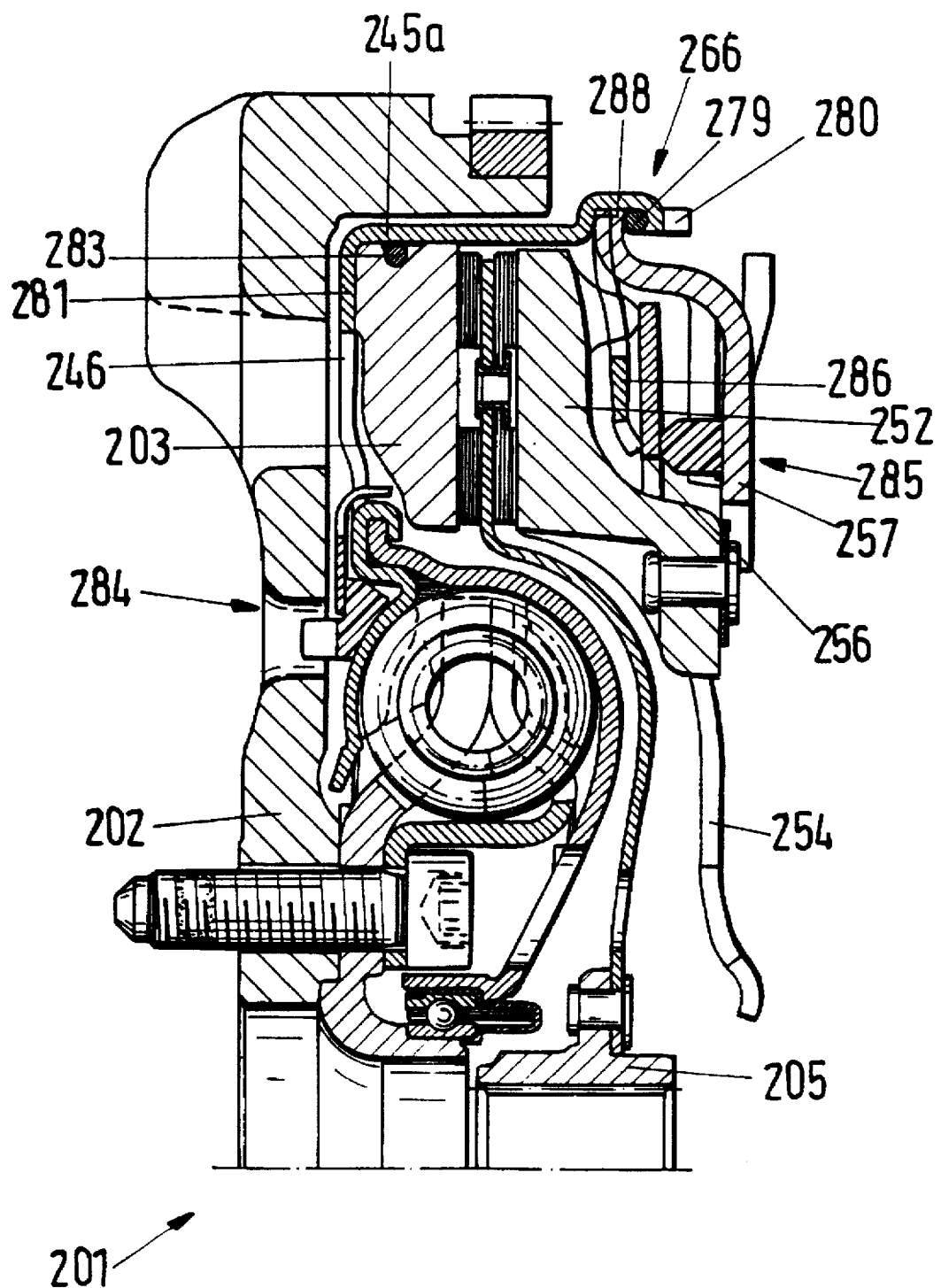
FIG. 4 is a fragmentary axial sectional view of a third torque transmitting apparatus.

FIG. 4 shows a third torque transmitting apparatus which constitutes a further modification of the apparatus of FIGS. 1 and 2. All such, parts of the apparatus of FIG. 4 which are identical with or clearly analogous to the corresponding parts of the apparatus of FIGS. 1 and 2 are denoted by similar reference characters plus 200.

The primary flywheel 202 of the composite flywheel 201 of FIG. 4 is a casting. The reference character 284 denotes a hysteresis device which operates between the flywheels 202, 203 of the composite flywheel 201 and serves to frictionally damp the oscillatory movements of the flywheels relative to each other. The damping action of the hysteresis device 284 can be effective during each and every stage of angular movement of the flywheels 202, 203 relative to each other or only during one or more selected stages of such angular movement. Furthermore, it is possible to select an oscillation damping device which furnishes a first braking or damping action while the, flywheels turn relative to each other in one direction but which furnishes a different (greater or smaller) braking or damping action during rotation of the flywheels relative to each other in another direction counter to the one direction.

The torque transmitting apparatus of FIG. 4 further comprises a unit 285 which automatically compensates for wear upon the friction linings 205A of the clutch disc 205 when the extent of wear reaches a selected magnitude. It is also possible to design the compensating unit 285 in such a way that it compensates for wear upon the friction linings 205A as well as for wear upon the friction surface 203a of the secondary flywheel 203 and for wear upon the friction surface 252a of the pressure plate 252 of the friction clutch. The unit 285 comprises a resilient element 286 which acts as a sensor by determining the extent of wear prior to an automatic adjustment or compensation for wear. The exact details of a wear compensating unit which can be utilized in the friction clutch of the improved torque transmitting apparatus are described and shown, for example, in commonly owned published German patent applications Nos. 42 39 291 corresponding to U.S. patent application Ser. No. 07/982,184, filed Nov. 25, 1993 and 42 39 289 corresponding to U.S. patent application Ser. No. 07/982,178, filed Nov. 25, 1993 as well as in the commonly owned copending German patent application No. P 43 22 677. The disclosures of the just-enumerated German patent applications and/or of the corresponding patent applications in countries (including the United States of America) other than Federal Republic Germany are incorporated herein by reference.

The secondary flywheel 203 is centered in the cylindrical portion 245a of the wall 246 by a corrugated spring 283 corresponding to the spring 183 in the apparatus of FIG. 3. Thus, it can be said that the periphery of the flywheel 203 is in mere (indirect) frictional engagement with the wall 246. It is also possible to omit the spring 283 and to establish a direct frictional engagement between the periphery of the flywheel 203 and the portion 245a of the wall 246.

The split wire ring 279 of the coupling device 266 shown in FIG. 4 performs the same function as the split ring 79 in the coupling device 66 of FIGS. 1 and 2. The device 266 is analogous to the device 66 because, in contrast to the coupling device 166 of FIG. 3, the cylindrical portion of the clutch housing 257 carries a radially outwardly extending collar (corresponding to the collar 67) which cooperates with the adjacent axially extending portion forming part of the portion 245a of the wall 246 and corresponding to the portion or component 70 of the coupling device 66 of FIGS. 1 and 2. The bent end portions 280 of the split ring 279 prevent rotation of this split ring relative to the housing 257 and/or wall 246.

The resilient sensor 286 of the wear compensating unit 285 has a radially inner portion 256 which bears upon the adjacent portion of the clutch spring 254 and replaces the seat 56 of FIG. 1. Furthermore, the sensor 286 replaces the lugs 58 of the housing 57 shown in FIG. 1. The radially outer portion of the sensor 286 (here shown as a diaphragm spring) engages the portion 245a of the wall 246, as at 288.

The bias of the axially stressed sensor 286 is such that this sensor urges the wall 246 and the housing 257 in the direction of the axis of the composite flywheel 201 and away from each other. In other words, the sensor 286 biases the collar of the housing 257 axially against the adjacent side of the split ring 279 whereby the split ring bears upon the adjacent fingers or teeth of the portion 245a. The mode of operation of the slip clutch, including those parts of the wall 246 and the secondary flywheel 203 which are adjacent each other to provide a friction surface 281, is the same as described with reference to FIGS. 1 and 2. The sensor 286 opposes the bias of the clutch spring 254 upon the pressure plate 252 when the friction clutch including the spring 254 is engaged. Thus, the actual bias to urge the flywheel 203 axially against the adjacent portion of the wall 246 equals the difference between the (larger) bias of the spring 254 upon the pressure plate 252 and the (smaller) bias of the sensor 286.

The means for limiting the magnitude of torque which the primary flywheel 202 and the damper including the energy storing elements 210 can transmit to the secondary flywheel 203 and thence to the clutch disc 205 (in the engaged condition of the friction clutch) is the slip clutch which includes the flywheel 203 and the wall 246, and more particularly those portions of the secondary flywheel and wall 246 which are adjacent each other at the friction surface 281.

The sensor 286 cannot rotate relative to the pressure plate 252 which, in turn, cannot rotate relative to the housing 257 and clutch spring 254. Therefore, the apparatus of FIG. 4 further comprises a second slip clutch (at 288) between the housing 257 and the split ring 279 which is compelled to rotate with the portion 245a of the wall 246, A further slip clutch can be established between the portion 245a of the wall 246 and the split ring 279. The friction surfaces of the aforediscussed friction clutches in each of the disclosed embodiments of the improved apparatus can be provided on suitable friction linings or friction shoes (e.g., layers of friction generating material applied to the left-hand side of the flywheel 203 and/or to the adjacent portion of the wall 246).

The hysteresis device 284 acts not unlike a slip clutch between the primary flywheel 202 and the wall 246 of the enclosure defining the chamber 211 for the energy storing elements 210 of the damper 209. This device acts in parallel with the energy storing elements 210 and its radial distance from the common axis of the flywheels 202, 203 matches that of the radially outer portions of the energy storing elements 210. The device 284 of FIG. 4 comprises one or more friction generating members which are biased in the direction of the common axis of the flywheels to bear upon the wall 246. Such friction generating member or members can be made, at least in part, of a suitable plastic material, for example, PTFE, PEEK or PA6.6.

FIG. 4 shows that the friction generating member or members of the device 284 are biased against the wall 246 by a diaphragm spring 284a which is carried by the wall 246. The connection between the spring 284a and the wall 246 can be permanent or separable. For example, the spring 284a can be separably affixed to the wall 246 by a bayonet mount, by snap action or in any other suitable way. The means for influencing the friction generating member or members of the device 284 can form part of the primary flywheel 202. FIG. 4 shows a portion 284b of the device 284; this portion is received in a recess of the flywheel 202. It is also possible to construct, assemble and mount the device 284 or an equivalent of this device in such a way that its operation is only indirectly influenced by the primary flywheel 202.

Figure 5C:
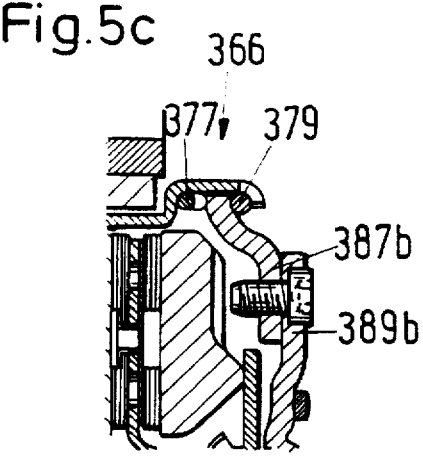
Figure 5A:
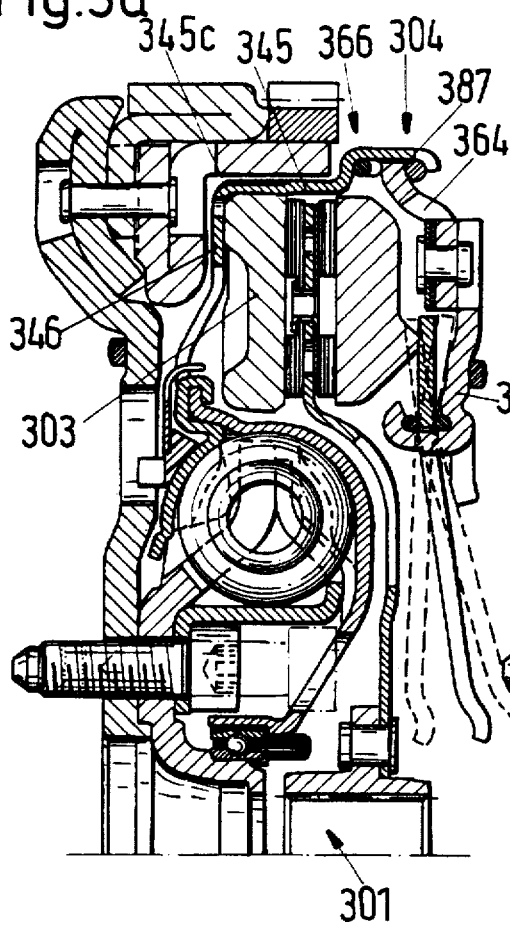
FIG. 5a is a fragmentary axial sectional view of a fourth torque transmitting apparatus, the coupling means being shown in the assembled condition.
Figure 5B:
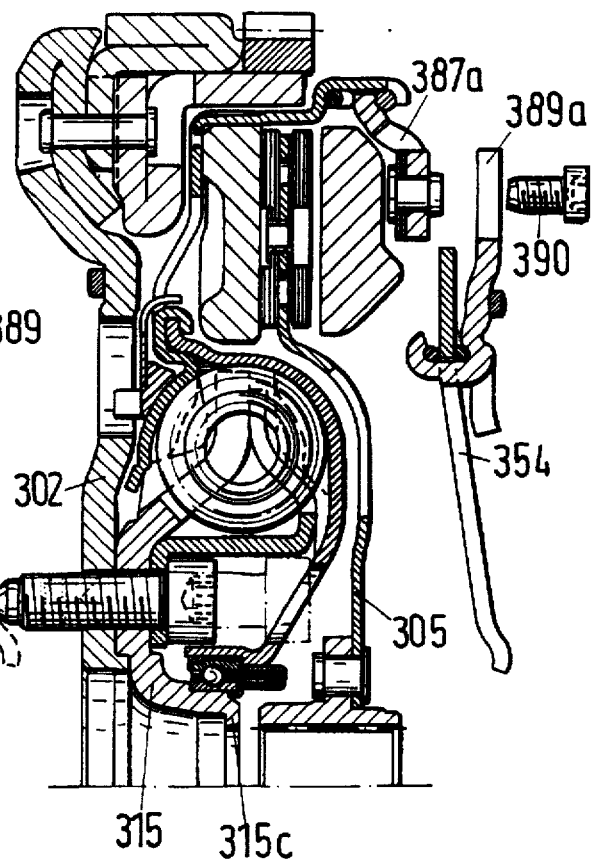
FIG. 5b shows the structure of FIG. 5a but with two portions of the housing of the friction clutch separated from one another.

FIGS. 5a, 5b and 5c show certain details of a further torque transmitting apparatus. All such parts of this apparatus which are identical with or clearly analogous to the corresponding parts of the apparatus of FIGS. 1 and 2 are denoted by similar reference characters plus 300.

The composite flywheel 301 of the apparatus which is shown in FIGS. 5a to 5c is similar to the composite flywheel 1. A difference is that the mass 321 is riveted to the main section 313 of the flywheel 302 and that the starter gear 319 is welded to or is a press fit on the mass 321. This is also in contrast to the apparatus of FIG. 4 wherein the primary flywheel 202 does not include a separately produced mass and wherein a separately produced starter gear 219 is bonded to or is a press fit on the primary flywheel.

The coupling device 366 of the torque transmitting apparatus of FIGS. 5a to 5c comprises a split wire ring 379 which is analogous to the split ring 79 in the coupling device 66 of FIGS. 1 and 2. In addition, the device 366 comprises threaded fasteners 390 which serve to separably secure two sections or portions 387 and 389 of the composite casing or housing 364 to each other. The elastic washer 377 of the coupling device 366 is disposed between the section 387 of the housing 364 and the wall 346 of the enclosure defining the chamber 311 for the energy storing elements 310 of the damper 309. Thus, the washer 377 bears directly against the wall 346 and housing 364 and ensures that the split ring 379 is adequately confined between the portion 345 of the wall 346 and the section 387 of the housing 364.

In order to prevent the secondary flywheel 303 from leaving the interior of the wall 346, the portion 345 is provided with resilient tongues 345c. Each tongue 345c can constitute a deformed part of the portion 345 of the wall 346. Such tongues are bent radially inwardly into the space within the portion 345 so as to bear upon the periphery of the secondary flywheel 303 when the latter is introduced into the portion 345 until its left-hand side abuts the adjacent radially extending portion of the wall 346. This establishes a frictionally locking and centering connection between the periphery of the flywheel 303 and the portion 345. Moreover, the tongues 345c and the flywheel 303 provide a slip clutch which opposes rotation of the flywheel 303 relative to the wall 346 with a desired force. The resiliency of the tongues 345c and hence the magnitude of their bias upon the periphery of the flywheel 303 determines the ability of the thus obtained slip clutch to prevent rotation of the wall 346 and the flywheel 303 relative to each other. In addition, the elastic tongues 345c can compensate for a certain amount of wear. It is presently preferred to provide the portion 345 of the wall 346 with at least three spaced-apart tongues 345c. In actual practice, the number of tongues 345c will exceed three, for example, several times.

The sections or portions 387, 389 of the housing 364 overlie each other in the region of the bottom wall, i.e., in the region where the housing 364 extends substantially radially of the common axis of the flywheels 302 and 303. The radially outer section 387 is separably coupled to the portion 345 of the wall 346 by the split ring 379 and the elastic washer 377. The radially inner part of the outer section 387 is provided with spaced apart teeth or tongues 387b which extend radially inwardly and alternate with recesses or slots 387a, as seen in the circumferential direction of the section 387. The radially outer part of the radially inner section 389 of the housing 364 is also provided with spaced apart teeth or tongues 389b which alternate with slots or recesses 389a. The sections 387, 389 can constitute separated parts of a sheet metal blank which is shaped in a suitable machine to form the sections 387, 389 and to provide each of these sections with the respective tongues or teeth and slots or recesses. The teeth 387b can constitute the material which was removed from the section 389 to form the recesses 389a and the teeth 389b can constitute the material which was removed from the section 387 to form the slots or recesses 387a. Such a design of the sections 387 and 389 ensures that they can be interfitted, e.g., in a manner as known from interfitting an externally splined shaft and an internally splined hub. For example, the hub of the clutch disc 305 can be provided with axially parallel alternating internal splines and teeth to ensure the establishment of a reliable torque transmitting connection between such hub and the complementary externally splined and toothed input element of a unit (e.g., a variable-speed transmission) which receives torque from the clutch disc 305 when the friction clutch 304 is engaged and the primary flywheel 302 is driven by the output element of a prime mover.

The sections 387 and 389 of the housing 364 are assembled in such a way that the teeth 389b overlie the adjoining teeth 387b (see particularly FIG. 5c) At least some of the teeth 389b are thereupon secured to the respective overlapped teeth by the fasteners 390, e.g., in the form of threaded bolts. The fasteners 390 are removed when the clutch disc 305 is to be inspected or replaced, and such removal does not entail any, even partial, destruction of one or more constituents of the torque transmitting apparatus. FIGS. 5a and 5c illustrate the torque transmitting apparatus in fully assembled condition ready for use, i.e., the fasteners 390 secure the sections 387, 389 of the housing 364 to each other. FIG. 5b shows the sections 387, 389 prior to coupling to each other or subsequent to removal of the fasteners 390.

The flange-like member 315 which forms part of a composite input member of the damper 309 is formed with a collar 315c which extends radially inwardly so that its left-hand side faces the primary flywheel 302. Such side can be engaged by a dismantling tool (not shown) which is introduced from the right-hand side of the torque transmitting apparatus to engage the left-hand side of the collar 315c for the purpose of stressing the clutch spring 354 in a sense to disengage the clutch 304. This reduces the stress upon the threaded fasteners 390 so that the section 389 of the clutch housing 364 can be more readily separated from the section 387.

A collar corresponding to the collar 315c can be provided on the flange-like members (such as 15, 115, 215) in torque transmitting apparatus wherein the housing is not assembled by employing two separable sections corresponding to the sections 387, 389 of the clutch housing 364. The aforementioned dismantling or disengaging tool is then used to disengage the respective friction clutch (such as 4, 164 or 204) in order to permit rotation of the clutch disc 5, 105 or 205. It is clear that the dismantling tool can be used in the apparatus of FIGS. 5a to 5c not only to facilitate the removal of threaded fasteners 390 but also to disengage the clutch 304 for the purpose of changing the angular position of the clutch disc 305 relative to the pressure plate 352 and the secondary flywheel 303 of the clutch 304. Still further, the dismantling tool can be used to disengage the friction clutch and to thus permit the primary flywheel 302 and the input and output members of the damper 309 to rotate relative to the friction clutch 304. This may be necessary in order to place the bores or holes (such as the holes 7 in the main section 13 of the primary flywheel 2 shown in FIG. 1) into accurate alignment with the openings or windows or passages in the clutch disc (5) and/or clutch spring (54) preparatory to the introduction of a tool which is used to detach the fasteners (8) from the output element of a prime mover.

The provision of the collar 315c constitutes a feature which is believed to be novel and patentable per se, i.e., not only for use in the torque transmitting apparatus which are described and shown in this specification but also in other types of torque transmitting apparatus. For example, an equivalent of the collar 315c can be utilized in apparatus of the type disclosed in the aforementioned German patent application No. 43 20 381 corresponding to U.S. patent application Ser. No. 08/262,620 filed Jun. 20, 1994. The collar 31 5c can be utilized with particular advantage in apparatus which employ composite flywheels because, once an apparatus of such character is put to use, the openings or holes or passages in the clutch disc and/or in the clutch spring are no longer in alignment with the holes of the primary flywheel. Therefore, the primary flywheel of such apparatus can be detached from the output element of the prime mover only upon accurate realignment or renewed alignment of all holes, bores, openings, windows and/or other passages which must be aligned in order to permit a tool to engage the heads of the fasteners (such as the bolts 8) preparatory to separation of the apparatus from the prime mover.

FIGS. 6a to 6c show a further torque transmitting apparatus. All such parts of this apparatus which are clearly analogous to or identical with the corresponding parts of the apparatus of FIGS. 1 and 2 are denoted by similar reference characters plus 400.

The coupling device 466 of the apparatus of FIGS. 6a to 6c comprises a ring-shaped clamping member 491 which serves to facilitate the assembly and dismantling of the device 466. The split wire ring 479 corresponds to the split ring 79. The corrugated elastic washer 477 is installed between the housing or cover 464 and the clamping member 491, which is located between the washer 477 and the wall 446 (as seen in the axial direction of the composite flywheel 401).

The pressure plate 452 of the friction clutch 404 is provided with circumferentially spaced apart tapped bores or holes 452a in register with openings or holes 465a in the clutch housing 464. This establishes paths for the introduction of threaded fasteners 491a so that the threaded shanks of the fasteners can be driven into the tapped bores 452a. Once the heads of the fasteners 491a engage the outer side of the housing 464, further rotation of such fasteners in a direction to penetrate deeper into the respective bores 452a causes the clutch spring 454 (here shown as a diaphragm spring) to yield so that the axially movable pressure plate 452 is moved closer to the bottom wall or end wall of the housing 464. In other words, the fasteners 491a serve as a means for disengaging the friction clutch 404. The pressure plate 452 is caused to move toward the housing 464 through a distance greater than that which is necessary to disengage the friction clutch 404 in actual use of the torque transmitting apparatus, and such axial movement of the pressure plate away from the secondary flywheel 403 is continued until a radially outer part 452b of the pressure plate engages the clamping member 491 (see FIG. 6a–6b). Further rotation of the fasteners 491a in a direction to move the pressure plate 452 away from the flywheel 403 results in simultaneous movement of the clamping member 491 in a direction away from the flywheel 403. This flattens the elastic washer 477 to gradually reduce the bias of the washer 477 upon the member 491 and hence upon the portion 470 of the wall 446. The split ring 479 is then readily separable from the components 470 and 464 of the coupling device 466 (FIG. 6c) and the portion 470 of the wall 446 can be completely separated from the housing 464 so that the operator or operators can gain access to the clutch disc 405.

The distance through which the pressure plate 452 is moved axially and away from the flywheel 403 can be less than shown in FIGS. 6b and 60, i.e., it is possible to remove the split ring 479 before it is moved completely out of frictional engagement with the portion 470 of the wall 446 and the adjacent portion of the housing 464.

FIG. 6a shows the friction clutch 404 in the fully engaged condition, i.e., the friction linings of the clutch disc 405 are clamped between the flywheel 403 and the pressure plate 452. FIG. 6b shows the friction clutch in the disengaged condition, i.e., the pressure plate no longer bears upon the adjacent friction linings. FIG. 6c shows the parts of the torque transmitting apparatus upon completion of separation of the housing 464 from the wall 446.

Figure 6D:
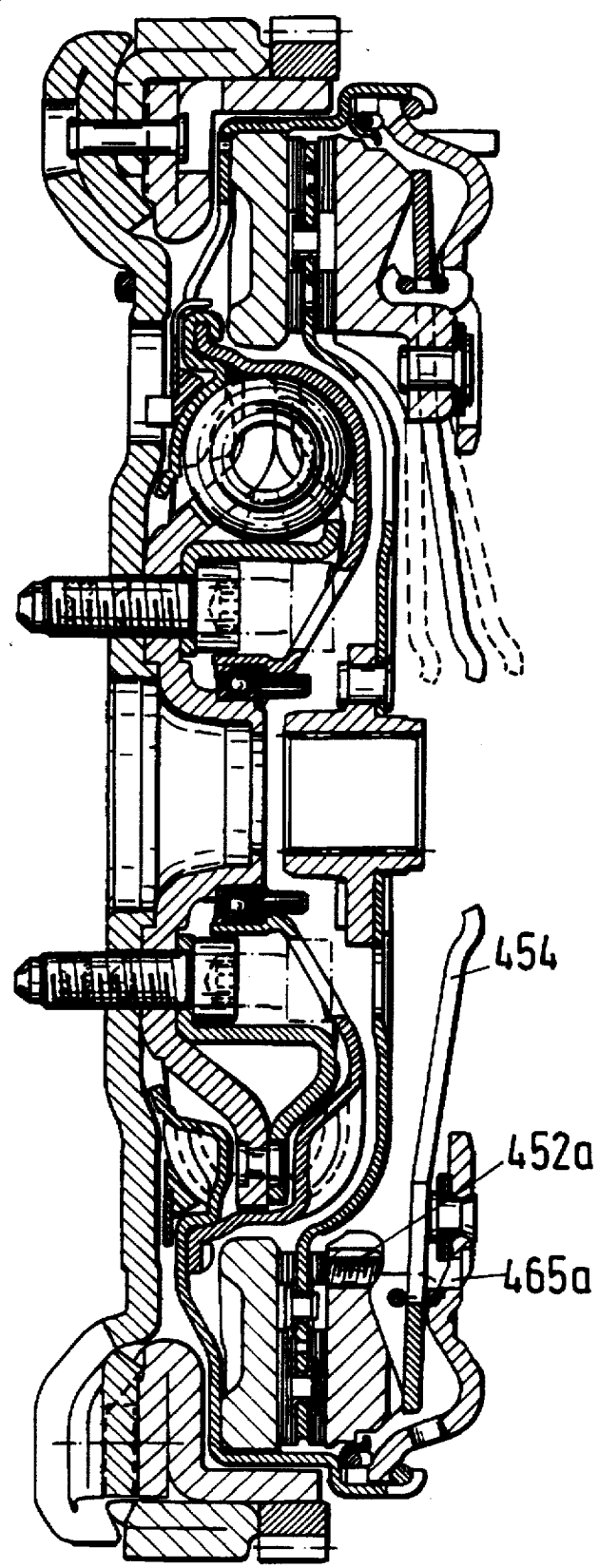
FIG. 6d is an axial sectional view of a sixth torque transmitting apparatus which constitutes a modification of the apparatus shown in FIGS. 6a to 6c.

The apparatus of FIG. 6d departs from that which is shown in FIGS. 6a to 6c because the tapped bores or holes 452a of the pressure plate 452 and the registering holes 465a of the housing 464 are located radially inwardly of the seats for the clutch spring 454 at the inner side of the bottom wall of the housing 464.

FIG. 7a shows a further embodiment of the improved torque transmitting apparatus. All such parts of this apparatus which are identical with or clearly analogous to the corresponding parts of the apparatus of FIGS. 1 and 2 are denoted by similar reference characters plus 500. The housing or cover 564 of the friction clutch 504 of the torque transmitting apparatus which is shown in FIG. 7a surrounds the pressure plate 552 as well as the secondary flywheel 503. The latter is biased against the adjacent radially extending portion of the wall 546 of the enclosure which defines a chamber for the energy storing elements of the damper between the flywheels 502 and 503 of the composite flywheel 501. The coupling device 566 comprises the radially outermost portion of the wall 546 and the adjacent end portion of the tubular or cylindrical portion of the housing 564. This coupling device comprises a wire ring 579 and a corrugated elastic washer 577 which is partially recessed into the peripheral surface of the flywheel 503 and is stressed in the direction of the common axis of the flywheels 502, 503 to clamp the ring 579 between the collar of the wall 546 and the left-hand end portion of the housing 564. The configuration of the teeth on the collar of the wall 546 and on the adjacent portion of the housing 564 is or can be the same as described with reference to FIG. 3 except that the coupling device 566 is located at the left-hand side of the flywheel 503.

The washer 577 biases the left-hand side of the secondary flywheel 503 into requisite frictional engagement with the adjacent side of the wall 546 to thus establish a slip clutch which serves as a means for limiting the magnitude of torque which can be transmitted from the primary flywheel 502 to the flywheel 503 of the friction clutch 504.

The corrugated elastic washer 577 can be used jointly with or can be replaced by a set of resilient prongs or tongues (not specifically shown) which are of one piece with the wall 546 and are in frictional engagement with the flywheel 503. The intensity of such frictional engagement determines the maximum torque which can be transmitted from the wall 546 to the flywheel 503 before the wall begins to rotate relative to the secondary flywheel. If the washer 577 is replaced with the aforediscussed prongs or tongues of the wall 546, the right-hand side of the flywheel 503 is caused to bear directly upon the housing 564 so that the teeth at the left-hand end of the housing urge the split ring 579 against the adjacent radially outwardly extending collar of the wall 546.

The torque transmitting apparatus of FIG. 7b departs from the apparatus of FIG. 7a in that the slip clutch is installed directly between the housing 564 of the friction clutch 504 and the secondary flywheel 503. The wall 546 of the composite output member of the damper between the flywheels 502, 503 of the composite flywheel is non-rotatably secured to the secondary flywheel by a set of threaded fasteners 503a. The heads of the fasteners 503a are accessible through windows 563 which are provided in the main section of the primary flywheel 502. In all other respects, the apparatus of FIG. 7b is or can be identical with the apparatus of FIG. 7a.

Figure 8:
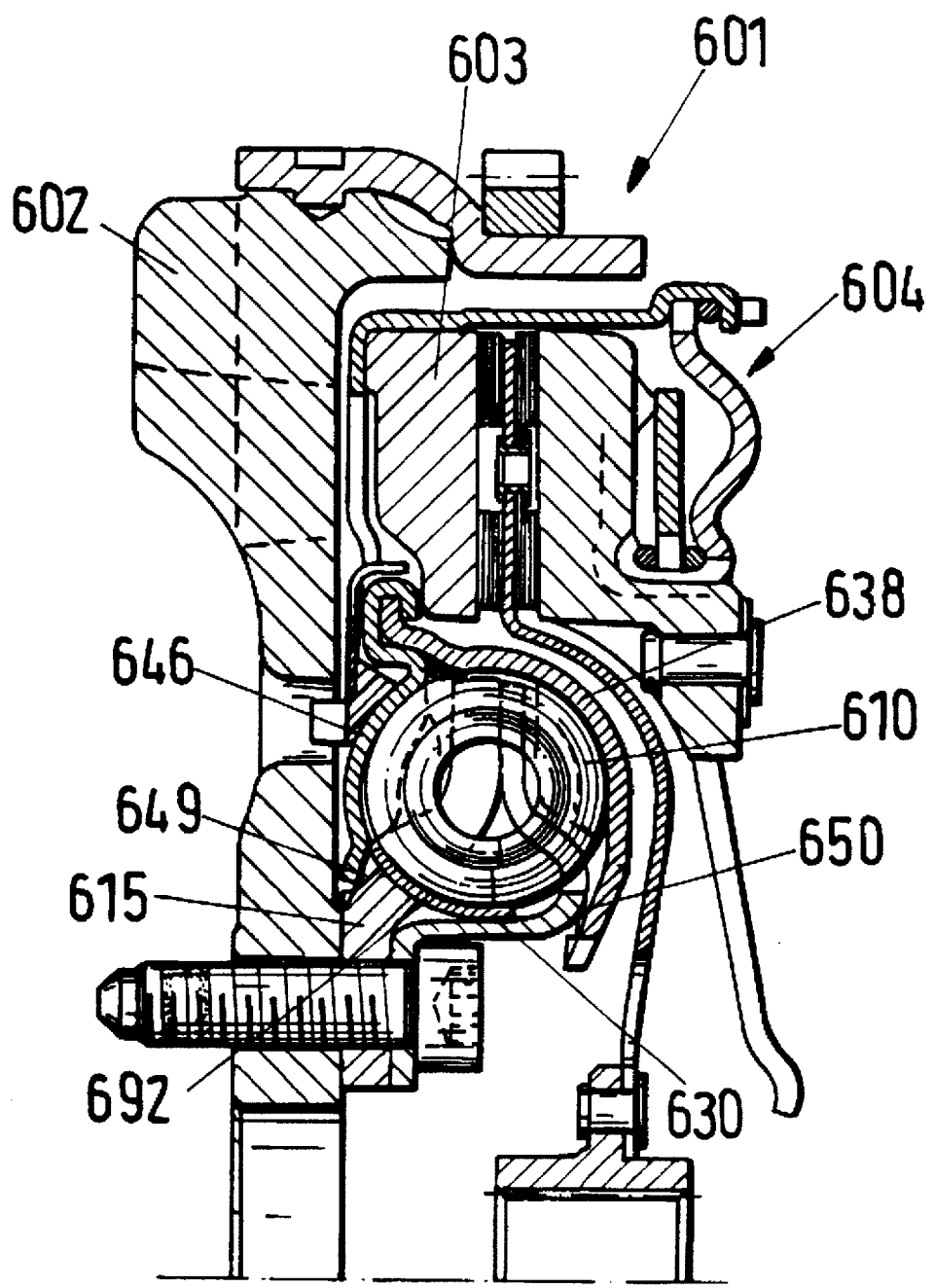
FIG. 8 is a fragmentary axial sectional view of a ninth torque transmitting apparatus.

FIG. 8 shows a portion of a further torque transmitting apparatus which embodies the invention. All such parts of this apparatus which are identical with or clearly analogous to the corresponding parts of the apparatus of FIGS. 1 and 2 are denoted by similar reference characters plus 600.

The apparatus which are shown in FIGS. 1 to 7b employ antifriction bearings (such as the ball bearing 6 of FIG. 1) which are installed between the input members (note the flange-like member 15 in the apparatus of FIG. 1) and the output members (note the wall 38 in the apparatus of FIG. 1) of the respective dampers (such as the damper 9 in the apparatus of FIG. 1). Such mounting of the bearings ensures that the primary and secondary flywheels of the respective apparatus can turn relative to each other, i.e., the dampers are able to oppose angular movements of the primary and secondary flywheels relative to each other. Furthermore, the antifriction bearings of the apparatus shown in FIGS. 1 to 7b can serve as a means for centering the input and output members of the respective dampers and/or the primary and secondary flywheels of the respective composite flywheels relative to one another.

The apparatus of FIG. 8 does not employ an antifriction bearing because the energy storing elements 610 of the damper are installed in such a way that they can perform the function of a bearing. The walls 638, 646 of the output member of the damper between the flywheels 602, 603 surround and are actually supported by the energy storing elements 610. The radially inner portions of the energy storing elements 610 engage the adjacent concave side of a further wall 692 which can be said to constitute an arcuate trough and can be assembled of two or more arcuate sections. The additional wall 692 centers the energy storing elements 610 and hence also the composite output member 638, 646 of the damper. Moreover, the wall 692 can perform the additional function of serving as a wear-resistant insert between the adjacent portions of the energy storing elements 610 and the flange-like members 615, 630 which together constitute or form part of an input member of the damper. The members 615, 630 are affixed to the primary flywheel 602 and support the additional wall or insert 692.

The annular chamber which is defined by the walls 638, 646 and 692 for the energy storing elements 61 0 of the damper between the flywheels 602 and 603 is sealed by a first sealing element 649 (e.g., a diaphragm spring) having a radially outer portion which bears or reacts against the wall 646 and a radially inner portion which reacts or bears against the member 615. A second sealing element 650 (e.g., a diaphragm spring) has a radially outer portion which bears or reacts against the member 630 and a radially inner portion which reacts or bears against the wall 638.

The chamber for the energy storing elements 610 is at least partially filled with a pulverulent or viscous lubricant.

An advantage of the apparatus of FIG. 8 is that the energy storing elements 610 not only perform the functions corresponding to those of the energy storing elements (such as 10) in the apparatus of FIGS. 1 to 7b but that they also serve as a bearing between the flywheels 602, 603 as well as a means for centering the input and output members and the primary and secondary flywheels relative to each other.

FIG. 9a shows a portion of a further torque transmitting apparatus. All such parts of this apparatus which are identical with or clearly analogous to the corresponding parts of the apparatus of FIGS. 1 and 2 are denoted by similar reference characters plus 700. The construction of the composite flywheel 701 is somewhat similar to that of the composite flywheel 601 of FIG. 8 except that the energy storing elements 710 of the damper do not serve as a bearing for the flywheels 702 and 703. The means for maintaining the two flywheels in requisite positions relative to each other includes the wall 738 and a flange-like member 793. The latter can be made of one piece (at least as seen in the direction of the common axis of the flywheels 702, 703) and replaces the flange-like members 615, 630 of the damper which is shown in FIG. 8. The illustrated member 793 is made of sintered material. The radially outer portion of the member 793 and the adjacent substantially axially extending portion of the wall 738 flank a set of friction reducing members 794 which can be said to constitute shoes and serve to accurately center the parts 738, 793 (and hence also the flywheels 702 and 703) relative to each other. Moreover, the shoes 794 prevent the parts 738 and 793 from directly engaging one another so that the wear upon the parts 738 and 793 is greatly reduced, minimal or nil.

The shoes 794 are preferably fixed to substantially radially extending arms of the member 793. The latter is preferably provided with at least three arms for an equal number of shoes 794, and each shoe can be form-lockingly secured to the respective arm. At the present time, the shoes 794 are preferably made of a plastic material such as PE, PA or PEEK, and each shoe can be reinforced by filaments.

The sealing elements 749 and 750 of the apparatus which is shown in FIG. 9a can serve the same purpose as described with reference to the apparatus of FIG. 8 as well the additional purpose of preventing wobbling of the flywheels 702, 703 relative to each other. In other words, the sealing elements 749 and 750 can cooperate with the shoes 794 to accurately center the flywheels 702 and 703 relative to one another. The sealing element 750 has a surface in contact with the adjacent portion of the wall 738. The wall 738 is biased by the sealing element 749 in a direction to the right, as viewed in FIG. 9a, so that it is in requisite engagement with the sealing element 750. The illustrated sealing element 749 is or resembles a diaphragm spring, and the sealing element 750 of FIG. 9a is made of a plastic material.

The apparatus of FIG. 9b differs from the apparatus of FIG. 9a in that the sealing element 750 is replaced with a composite sealing element 750' including a first portion of suitably shaped metallic sheet material and a second portion which is or acts not unlike a diaphragm spring. The composite sealing element 750' is installed between the wall 738 and the bearing member 793 of sintered material. In all other respects, the apparatus of FIG. 9b is or can be identical with or similar to the apparatus of FIG. 9a.

The manner of utilizing parts of the damper as a means for centering the flywheels of a composite flywheel relative to each other so that one need not employ a discrete antifriction or friction bearing is not limited to the embodiments of FIGS. 8, 9a and 9b but can be relied upon in connection with the making and assembling of many other types of torque transmitting apparatus, e.g., those described and shown in the aforementioned German patent application No. P 43 20 381 corresponding to U.S. patent application Ser. No. 08/262,620 filed Jun. 20, 1994.

The aforedescribed and illustrated torque transmitting apparatus constitute but a few examples of torque transmitting apparatus which can embody one or more features of the present invention. For example, certain features of the apparatus of FIGS. 1 and 2 can be embodied in the apparatus of FIGS. 3 to 9b, certain features of the apparatus of FIG. 3 can be embodied in the apparatus of FIGS. 1, 2 and 4 to 9b, and so forth. Furthermore, the appended claims do not specifically cover all of the novel features of the improved apparatus; such features are intended to be covered during the pendency of the present application and/or in one or more continuations, continuations-in-part and/or divisions of the present application. Moreover, the invention or certain features of the invention can be embodied in apparatus of the type disclosed in the German patent applications Nos. P 43 20 381 corresponding to U.S. patent application Ser. No. 08/262,620 filed Jun. 20, 1994, P 43 11 908 corresponding to U.S. patent application Ser. No. 08/044,031, filed Apr. 7, 1993, P 43 15 209 corresponding to U.S. patent application Ser. No. 08/230,910, filed Apr. 21, 1993 and P 43 22 677 as well as in the published German patent applications Nos. 42 39 289 corresponding to U.S. patent application Ser. No. 07/982,178, filed Nov. 25, 1993 and 42 39 291 corresponding to U.S. patent application Ser. No. 07/982,184, filed Nov. 25, 1993. The disclosures of all such applications as well as of the corresponding patents and/or patent applications granted and/or pending in countries other than Federal Republic Germany are intended to be incorporated herein by reference.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. Apparatus for transmitting torque, comprising: a first flywheel connectable with a rotary output element; an engageable and disengageable friction clutch connectable with a rotary input element; a second flywheel rotatable with as well as relative to said first flywheel about a common axis; and means for opposing rotation of said flywheels relative to each other including at least one damper having energy storing means acting in a circumferential direction of said flywheels, said at least one damper and said friction clutch constituting a power train between said first flywheel and the input element, said power train including a slip clutch having means for separably connecting a first and a second component of the power train to each other and means for limiting the magnitude of torque transmittable between said first flywheel and the input element in the engaged condition of said friction clutch.

2. The apparatus of claim 1, wherein said friction clutch comprises a clutch spring forming part of said torque limiting means.

3. The apparatus of claim 1, wherein said friction clutch comprises a clutch spring and said clutch spring includes a diaphragm spring.

4. The apparatus of claim 1, wherein said second flywheel comprises a first annular friction surface forming part of said friction clutch and disposed at a first radial distance from said common axis, said torque limiting means comprising a second friction surface provided on said second flywheel at a second radial distance from said common axis, said second distance being equal to or approximating said first distance.

5. The apparatus of claim 1, wherein said friction clutch comprises a counterpressure plate and means for rotating said counterpressure plate exclusively by friction.

6. The apparatus of claim 1, wherein said power train comprises means for rotating said friction clutch exclusively by friction.

7. The apparatus of claim 1, wherein one of said first and second components includes an output member of said at least one damper and the other of said components includes a housing of said friction clutch, said second flywheel being mounted on said output member.

8. The apparatus of claim 7, wherein said output member comprises a portion extending at least substantially radially of said common axis and overlying a collar of said housing.

9. The apparatus of claim 7, wherein one of said housing and said output member comprises a collar, and the other of said housing and said output member comprises a portion extending substantially radially of said common axis and overlying said collar, said radially extending portion having an inner diameter and said collar having an outer diameter greater than said inner diameter.

10. The apparatus of claim 1, wherein said connecting means further comprises a split ring separably connecting said first and second components to each other.

11. The apparatus of claim 10, wherein said connecting means further comprises means for preventing rotation of said split ring relative to at least one of said first and second components.

12. The apparatus of claim 11, wherein said split ring comprises neighboring end portions and said preventing means comprises an abutment for at least one of said end portions.

13. The apparatus of claim 10, wherein one of said first and second components includes a collar and the other of said components includes a portion extending substantially radially of said common axis and overlying said collar, said radially extending portion including a first set of tongues engaging said split ring, and said collar including a second set of tongues engaging said split ring.

14. The apparatus of claim 1, wherein said torque limiting means comprises a clutch spring forming part of said friction clutch and being stressed in the direction of said axis at least in the engaged condition of said friction clutch, and at least one additional spring stressed in the direction of said common axis.

15. The apparatus of claim 14, wherein said at least one additional spring comprises an elastic washer between a housing of said friction clutch and said second flywheel.

16. The apparatus of claim 1, wherein said at least one damper further comprises an output member including a portion which is biased by said energy storing means to rotate said second flywheel in response to rotation of said first flywheel.

17. The apparatus of claim 1, wherein said friction clutch has a friction surface disposed at a first radial distance from said common axis and said energy storing means is disposed at a lesser second radial distance from said common axis.

18. The apparatus of claim 1, wherein said at least one damper further comprises an enclosure driven by one of said flywheels and defining a chamber at least partially confining said energy storing means.

19. The apparatus of claim 18, further comprising a supply of a viscous lubricant at least partially filling said chamber.

20. The apparatus of claim 18, wherein said chamber extends in said circumferential direction of said flywheels.

21. The apparatus of claim 18, wherein said enclosure includes a wall forming part of one of said first and second components.

22. The apparatus of claim 1, wherein said at least one damper further comprises an input member between said first flywheel and said energy storing means and an output member disposed between said energy storing means and said second flywheel and including an enclosure defining a chamber at least partially confining said energy storing means, said friction clutch having a first friction surface disposed at a first radial distance from said axis and said torque limiting means having a second friction surface disposed radially outwardly of said energy storing means at a second radial distance from said axis, said second distance matching or approximating said first distance and said torque limiting means being interposed between said output member and said second flywheel.

23. The apparatus of claim 1, wherein said friction clutch comprises a clutch disc arranged to transmit torque to the input element, said first flywheel and said friction clutch forming part of a preassembled module and further comprising means for affixing said module to the output element.

24. The apparatus of claim 23, wherein said means for affixing comprises fasteners forming part of said module.

25. The apparatus of claim 24, wherein said module further comprises means for preventing accidental detachment of said fasteners from at least one of said friction clutch and said first flywheel.

26. The apparatus of claim 1, wherein said friction clutch is a push-type clutch.

27. Apparatus for transmitting torque comprising a first flywheel connectable to a rotary output element and a power train, said power train comprising: an engageable and disengageable friction clutch connectable to an input element; a second flywheel rotatable with as well as relative to said first flywheel about a common axis; means for opposing rotation of said flywheels relative to each other including at least one damper having energy storing means, an input member between said first flywheel and said energy storing means, and an output member disposed between said energy storing means and said second flywheel and including an enclosure at least partially confining said energy storing means; means for limiting the magnitude of torque transmittable between said first flywheel and the input element in the engaged condition of said friction clutch; and means for separably connecting a first and a second component of said power train to each other, said components forming part of a slip clutch.

28. Apparatus for transmitting torque between rotary input and output elements, comprising a first flywheel connectable to the output element and a power train between said first flywheel and the input element, said power train comprising: an engageable and disengageable friction clutch including a second flywheel rotatable with as well as relative to said first flywheel about a common axis; means for opposing rotation of said flywheels relative to each other, including at least one damper having energy storing means acting in a circumferential direction of said flywheels; means for separably connecting a first component to a second component of said power train, said first and second components forming part of a slip clutch having means for limiting the magnitude of torque which is being transmitted between said first flywheel and the input element in response to rotation of said first flywheel.

29. The apparatus of claim 28, wherein one of said first and second components is an output member of said at least one damper and the other of said first and second components is a housing of said friction clutch.

* * * * *

UNITED STATES PATENT AND TRADEMARK OFFICE
CERTIFICATE OF CORRECTION

PATENT NO. : 5,680,918

DATED : October 28, 1997

INVENTOR(S) : Wolfgang REIK et al.

It is certified that error appears in the above-identified patent and that said Letters Patent is hereby corrected as shown below:

Title page, [75], Inventors, change "Albert Albert" to --Albert Albers--.

Signed and Sealed this

Tenth Day of March, 1998

Attest:

BRUCE LEHMAN

*Attesting Officer*     *Commissioner of Patents and Trademarks*